(12) United States Patent
Jezorek et al.

(10) Patent No.: US 11,042,869 B1
(45) Date of Patent: Jun. 22, 2021

(54) METHOD, MEDIUM, AND SYSTEM FOR ASSOCIATING A PAYMENT AMOUNT WITH A PHYSICAL OBJECT

(71) Applicant: Amazon Technologies, Inc., Reno, NV (US)

(72) Inventors: Matthew Ryan Jezorek, Maple Valley, WA (US); Scott Kenneth Bishop, Seattle, WA (US); Brenda Renee' Campbell, Seattle, WA (US); Darren Ernest Canavor, Redmond, WA (US); Scott Donald Gregory, Issaquah, WA (US); Jesper Mikael Johansson, Redmond, WA (US); David James Kane-Parry, Seattle, WA (US); Eric Michael Laird, Seattle, WA (US); Brian Young Lee, Seattle, WA (US); Ido Mittelman, Redmond, WA (US); Gregory Branchek Roth, Seattle, WA (US); James Arthur Wilson, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 739 days.

(21) Appl. No.: 14/503,324

(22) Filed: Sep. 30, 2014

(51) Int. Cl.
*G06Q 20/34* (2012.01)
*G06Q 20/40* (2012.01)

(52) U.S. Cl.
CPC ....... *G06Q 20/3552* (2013.01); *G06Q 20/342* (2013.01); *G06Q 20/4014* (2013.01)

(58) Field of Classification Search
CPC ............ G06Q 20/3552; G06Q 20/342; G06Q 20/4014
(Continued)

(56) References Cited

U.S. PATENT DOCUMENTS

| 8,157,086 B1 | 4/2012 | Gallegos et al. |
| 2004/0177032 A1 | 9/2004 | Bradley |

(Continued)

OTHER PUBLICATIONS

Gurary, Johnathan. 2018, Improving the Security of Mobile Devices Through Multi-Dimensional and Analog Authentication, Cleveland State University. (Year: 2018).*

(Continued)

*Primary Examiner* — Matthew E Zimmerman
*Assistant Examiner* — Latasha D Ramphal
(74) *Attorney, Agent, or Firm* — Davis Wright Tremaine LLP

(57) ABSTRACT

A payment object service receives a request from a giver to associate a payment amount to an object. The request includes one or more images of the object and recipient information, which the payment object service uses to determine whether the association between these images and the information is unique. If the association is unique, the payment object service updates a database to associate the payment amount to the object and enable redemption of the payment amount. When the payment object service receives a request to redeem at least a portion of the payment amount, the payment object service may use one or more images and recipient information obtained from the request to verify that the images and information together correspond to the object. Once the redemption is complete, the payment object service may update the database to specify the current remaining payment amount.

19 Claims, 20 Drawing Sheets

(58) Field of Classification Search
USPC .................................................... 705/26–27
See application file for complete search history.

(56) References Cited

U.S. PATENT DOCUMENTS

| | | |
|---|---|---|
| 2011/0072493 A1 | 3/2011 | Morishita et al. |
| 2012/0233076 A1 | 9/2012 | Sutcliffe et al. |
| 2013/0166441 A1 | 6/2013 | Kobylkin et al. |
| 2014/0046837 A1* | 2/2014 | Metral .................. G06Q 40/02 705/41 |
| 2014/0156053 A1 | 6/2014 | Mandavi et al. |
| 2014/0156531 A1 | 6/2014 | Poon et al. |
| 2014/0258055 A1* | 9/2014 | Wolfe .................. G06Q 20/105 705/30 |
| 2014/0282923 A1 | 9/2014 | Narayan et al. |
| 2014/0362228 A1 | 12/2014 | McCloskey et al. |
| 2014/0379119 A1 | 12/2014 | Sciacchitano et al. |
| 2015/0003733 A1* | 1/2015 | Wang .................. G06K 9/3283 382/182 |
| 2015/0088290 A1 | 3/2015 | Ghosh |
| 2015/0095213 A1* | 4/2015 | Paintin ................. G06Q 20/349 705/39 |
| 2015/0306824 A1 | 10/2015 | Flores Mangas et al. |
| 2015/0348045 A1 | 12/2015 | Agarwal et al. |
| 2016/0004880 A1 | 1/2016 | Collins et al. |

OTHER PUBLICATIONS

McLeod, M., "Scientist Develop Ultra-Tough, Ultra-Light 3D Printed Meta-Material," Design Engineering, Jun. 25, 2014, <http://www.design-engineering.com/materials/scientist-develop-ultra-tough-ultra-light-3d-printed-meta-material-131769/> [retrieved Apr. 24, 2015], 4 pages.

"Mcor Technologies 3D Printers," mcor technologies, <http://mcortechnologies.com/3d-printers/> [retrieved Apr. 24, 2015], 5 pages.

Poeter, D., "Hershey Shows off 3D-Printed Chocolate," PC Magazine, Dec. 19, 2014, <http://www.pcmag.com/article2/0,2817,2473988,00.asp> [retrieved Apr. 24, 2015], 4 pages.

White, "How Computers Work," Que Publishing, 7th Edition, Oct. 15, 2003, 23 pages.

* cited by examiner

METHOD, MEDIUM, AND SYSTEM FOR ASSOCIATING A PAYMENT AMOUNT WITH A PHYSICAL OBJECT

BACKGROUND

Gift cards are often utilized by customers as an alternative to a fiat currency when transacting with a payment object service or other service. These gift cards may be customizable, such that a customer may add a custom message, name or graphic to a payment object to make the particular gift card unique. However, once a gift card has been depleted, the gift card may no longer have intrinsic value to the customer or other recipient, resulting in the customer or other recipient discarding the gift card. Additionally, such gift cards, even with the level of customization permissible, may not be as desirable to certain recipients as other gifts, since such gift cards may be limited in their utility once the payment amount associated with the gift cards has been depleted.

BRIEF DESCRIPTION OF THE DRAWINGS

Various embodiments in accordance with the present disclosure will be described with reference to the drawings, in which.

DETAILED DESCRIPTION

Figure 1:
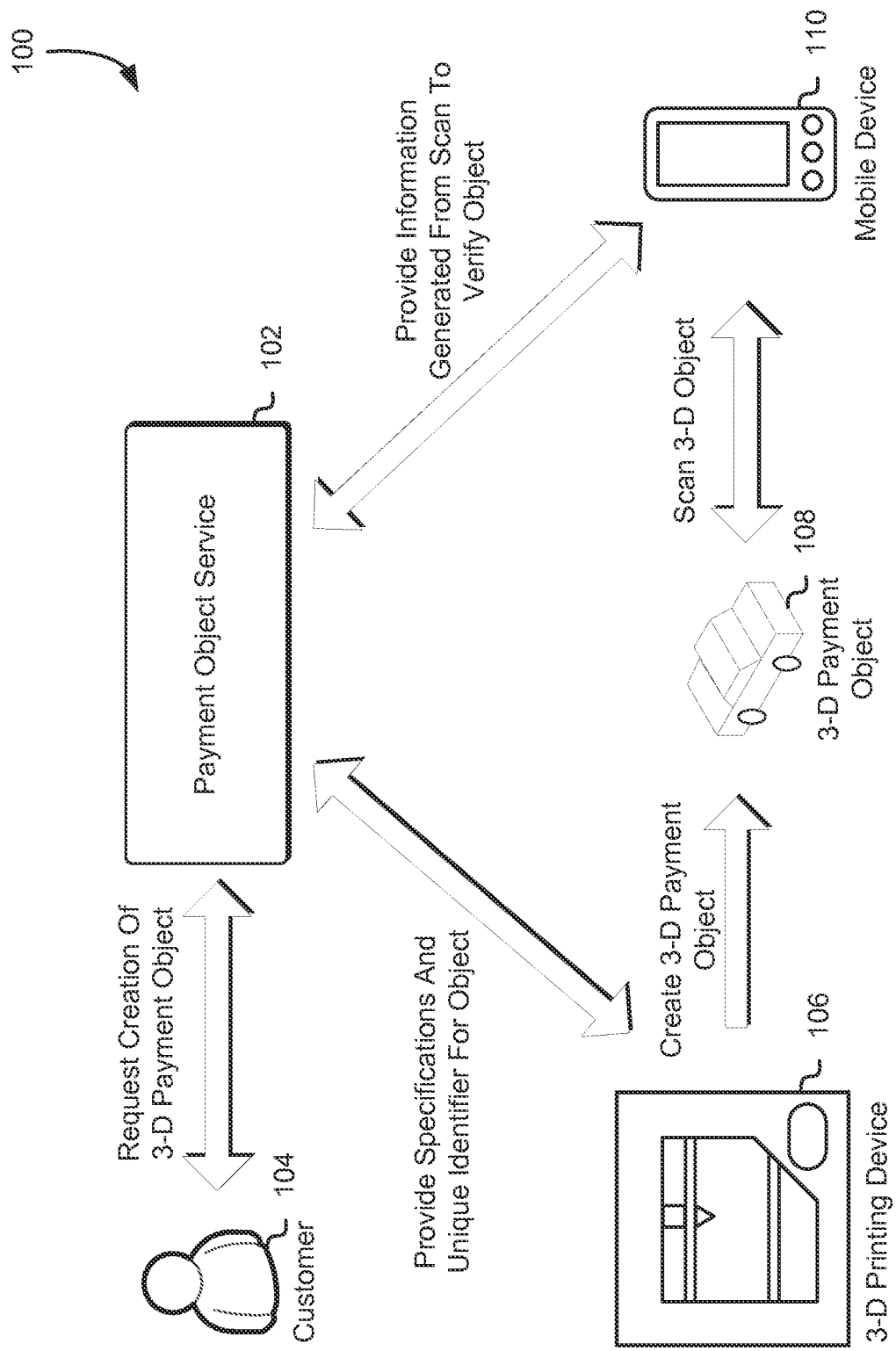
FIG. 1 shows an illustrative example of an environment in which a three-dimensional payment object can be created and redeemed in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the creation, management and use of three-dimensional (3-D) payment objects and authentication objects. In an embodiment, an entity (e.g., an organization or customer) utilizes an interface, provided by a payment object service or other service, to request creation of a 3-D payment object or authentication object and associate a value, restrictions or rules to the object that is to be created. The interface may be configured to include a design selection window pane, which the entity may utilize to select one or more 3-D payment object designs, provided by the payment object service, for use in creating the 3-D payment object. Additionally, the interface may include an option to enable the entity to upload images of an object to the payment object service such that these images may be used to generate the desired 3-D payment object. Once the entity has either selected a design from the design selection pane or has uploaded his/her own images to be used in the creation of the 3-D payment object, the entity may specify the value that is to be associated with the object to be created. Additionally, the entity may specify, through the interface, whether the 3-D payment object is to be created utilizing a 3-D printing service associated with the payment object service or utilizing a 3-D printing device that is accessible to the entity (e.g., in the case of an end-customer, a personal 3-D printing device). The entity may specify, through the interface, the payment amount that is to be associated with the 3-D payment object. The entity may be a customer of a payment object service that associates a value to the 3-D payment object and processes any transactions between various customers and a merchant or retailer.

In some embodiments, an entity may select an existing object that itself may be utilized as a payment object. For instance, an entity may scan an object of his/her choosing and upload the scanned images of the object to the payment object service. The entity may utilize the interface to specify a payment amount that is to be applied to the particular object the entity has selected. If the payment object service determines, based on an analysis of the scanned images of the object, that the object is not unique (e.g., mass-produced object readily available in retail stores, etc.), the payment object service may request that the entity provide additional recipient information that may be used to associate the payment amount to the object. Once the entity has provided the requisite recipient information or the selected object has been determined to be unique, the payment object service may apply the specified payment amount to the object and notify the entity that the specified payment amount has been applied to the object. This notification may enable the entity to provide the selected object to the recipient or the payment object service to deliver the selected object to the recipient on the entity's behalf with instructions for redemption of the associated payment amount.

In addition, or as an alternative, to selecting an object for use as a payment object, the entity may select a contact for which a payment amount may be associated with. For instance, an entity may provide the payment object service with information associated with a particular contact of the entity's choosing that may be associated with a payment amount. For example, the entity may provide a digital photograph of the recipient to the payment object service. This digital photograph may be used to associate a payment value to a recipient. Thus, when a recipient takes a digital photograph of himself/herself and uploads the photograph to the payment object service, the payment object service may be able to utilize facial recognition techniques to determine whether there is a payment amount associated with the recipient. In some embodiments, the entity may select a contact in order to provide sufficient recipient information for a non-unique object that is to be used as a payment object and delivered to the recipient.

When an entity or recipient of the 3-D payment object submits a request to utilize the 3-D payment object for a payment transaction, the payment object service may receive images of 3-D payment object (e.g., in the form of a video or multiple still images) in order to determine whether the images correspond to any 3-D payment objects previously created by the payment object service or the entity. If the received images do correspond to an existing 3-D payment object, the payment object service may determine the associated value of the 3-D payment object and apply this value to the present transaction, to a future transaction or to the entity/recipient's account, based on the preferences of the entity or recipient. Once the value of the 3-D payment object has been applied to a transaction or account, the payment object service may update the value of the 3-D payment object. In an embodiment, if the provided images do not match any existing 3-D payment objects, the payment object service may deny the entity's or recipient's request to utilize the 3-D payment device.

In this manner, an entity may create and provide 3-D payment objects to other recipients and enable these recipients to utilize the 3-D payment objects for payment transactions. In addition, the techniques described and suggested herein facilitate additional advantages. For example, because the 3-D payment object may be created based on various objects and images, the 3-D payment object may be useful to the entity or recipient even after the associated payment value of the 3-D payment object has been exhausted. Thus, the 3-D payment object may still retain intrinsic value to the entity or recipient. Various technical advantages are also achieved by various embodiments of the present disclosure. For instance, various security advantages are achieved through the use of three-dimensional objects can provide high entropy and, generally, the complexity of unique features that make up a three-dimensional object are, in various embodiments, stronger than those found with more conventional authentication techniques, such as the use of passwords, where strong passwords often require users to memorize complex strings. As another example, a unique feature of a three-dimensional object may not be readily discernable except, perhaps, by a computer system programmed to detect such unique features. In some examples, such as where some or all image processing is done locally on a mobile or other device, more efficient operation of a distributed computer system (e.g., including a mobile device and a server) is achieved through the ability to perform some operations without network calls. In some examples, various embodiments of the present disclosure increase safety (e.g., for children) by enabling the setting of rules associated with three-dimensional objects to limit, for some users, the access a three-dimensional object can be used for (e.g., to certain resources). Generally, embodiments of the present disclosure improve the field of authentication for various purposes, such as authentication for access to resources and authentication of payments.

FIG. 1 shows an illustrative example of an environment 100 in which various embodiments can be implemented. In the environment 100, a customer 104 may access, through one or more computing devices, a customer interface provided by a payment object service 102. The customer 104 may be an individual, organization or automated process that could utilize the payment object service 102 to request creation of a 3-D payment object 108, which may be used as a substitute for fiat currency or other currencies (e.g., cryptocurrencies, virtual currencies, etc.) for certain transactions with the merchants/retailers associated with the payment object service 102. The payment object service 102 may include a plurality of computing hardware resources, such as hardware servers, data storage devices, network devices and other equipment, such as server racks, networking cables and the like. Alternatively, a service provider may utilize this plurality of computing hardware resources to execute software that may be used to implement the payment object service 102. These computing hardware resources may be configured to, among other things, provide the customer 104 with the aforementioned customer interface, which may include various elements that may enable the customer 104 to specify the desired design of the 3-D payment object 108 and an associated payment value. For instance, in an embodiment, the customer interface provided by the payment object service 102 includes a design selection window pane, which may comprise one or more images or 3-D models that may be used to generate a 3-D payment object 108. These images may be provided by the payment object service 102 as default designs that may be available to all customers 104 and are managed by the payment object service 102. Alternatively, the payment object service 102 may enable customers 104 to upload their own images which may be used to create the 3-D payment object 108.

While 3-D payment objects 108 are used extensively throughout the present disclosure for the purpose of illustration, the 3-D objects that are to be generated may be used for other purposes. For instance, in some embodiments, the 3-D object may be used for authentication of a recipient of the object based at least in part on the association between the 3-D object and recipient information. For example, a 3-D object may be associated with one or more restrictions, pre-defined user permissions and the like. The 3-D authentication object may include one or more unique features that, when presented for authentication, may cause an authentication service to determine whether any of these one or more restrictions and/or permissions are associated with the presented 3-D object. For instance, a user of the 3-D authentication object may utilize a mobile device to scan the 3-D authentication object and upload the scanned images of the 3-D authentication object to the authentication service in order to access the authentication service or some other service. Alternatively, the 3-D authentication object may be used as an identifier for an individual such that the 3-D authentication object may be scanned to verify the identity of the individual. For instance, a customer may rely on a 3-D authentication object to ensure that a value added services (VAS) contractor is who he/she claims to be. The 3-D authentication object may further be utilized for aesthetic purposes in addition to authentication purposes (e.g., wall mounts for television units, furniture, fixtures, etc.).

The 3-D authentication object may further be associated with one or more payment accounts corresponding to a particular individual. For instance, the 3-D authentication object may be attached to a vehicle and utilized for automated toll payments. In yet another example, the 3-D authentication object may be utilized to prove that a person is actually a human. For instance, the 3-D authentication object may be utilized as a response to a Completely Automated Public Turing test to tell Computers and Humans Apart (CAPTCHA) challenge. If the 3-D authentication object created utilizing a customer's 3-D printing device is authentic, the customer may present the 3-D authentication device to fulfill the CAPTCHA challenge. The 3-D authentication object may further be utilized by a machine or robot to authenticate itself against another machine and/or robot. In some embodiments, the 3-D authentication object may be used as a replacement for common forms of identification, such as passports, driver's licenses and the like.

If a customer 104 uploads one or more images to the payment object service 102 through the customer interface, the payment object service 102 may perform one or more operations to ensure that the 3-D payment object 108 to be created will be unique. For instance, in some embodiments, the payment object service 102 may decompose the received one or more images into one or more vectors (e.g., spatial coordinates, etc.) based at least in part on the one or more identified contours of the desired object illustrated in the one or more images. The payment object service 102 may compare these one or more vectors to other known vectors for other 3-D payment objects to determine whether the desired 3-D payment object 108 to be created is unique. If the desired 3-D payment object 108 is not unique, the payment object service 102 may modify the received one or more images to introduce one or more unique features that may be incorporated into the 3-D payment object 108. For instance, the payment object service 102 may incorporate a textured bar code, quick response (QR) code, icons, textures and other elements that would make the 3-D payment object 108 unique to the customer 104 or intended recipient of the 3-D payment object 108. Alternatively, the payment object service 102 may provide the customer with one or more options that may include sufficient differences from the perspective of the payment object service 102 to render the 3-D payment object 108 that is to be created unique. In another example, the payment object service 102 may enable the customer to select an alternative to the one or more images provided. It should be noted that these unique features may render the 3-D payment object 108 to be unique in a database of payment objects such that, by providing information corresponding to these unique features, the payment object service 102 may identify a record of the 3-D payment object 108 within the database. The payment object service 102 may store these modified images within an object data repository for later use by the customer 104 and for verification of the 3-D payment object 108 once activated. In an embodiment, the records stored within the database may be transformed using a one-way function or otherwise based, at least in part, on a one-way function, such as a cryptographic hash function, message authentication code algorithm, or a key derivation function. It should be noted that the phrase "one-way function" includes functions that are not necessarily one-way in the strict mathematical sense, but that exhibit properties (such as collision resistance, pre-image resistance and second pre-image resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. The service 102 may utilize output of the one-way function in a manner that the output of the one-way function may be associated with the payment amount.

The customer interface provided by the payment object service 102 may further enable a customer 104 to determine whether the 3-D payment object 108 is to be created using a 3-D printing device 106 accessible to the customer 104 or by a 3-D printing service associated with the payment object service 102. For instance, if the customer 104 opts to create the 3-D payment object 108 utilizing his/her 3-D printing device 106, the payment object service 102 may provide the specifications of the selected 3-D payment object 108 to the customer's 3-D printing device 106, which may print the 3-D payment object 108. Alternatively, if the customer 104 opts to allow the payment object service 102 to utilize a 3-D printing service to create the 3-D payment object 108, the payment object service 102 may transmit the specifications for the 3-D payment object 108 to the 3-D printing service. This may enable the 3-D printing service to identify the appropriate one or more 3-D printing devices 106 that may be utilized to create the 3-D payment object 108. Further, this may enable the payment object service 102 to incorporate, through the 3-D printing service, additional security features to the 3-D payment object 108. For instance, in some embodiments, the payment object service 102 may cause the 3-D printing service to inject the 3-D payment object 108 with a radio-frequency identification (RFID) chip, which may be used to identify the particular 3-D payment object 108 and differentiate it from other such objects. While RFID chips are used throughout the present disclosure for the purpose of illustration, other unique elements may be incorporated into the 3-D payment object 108 to enhance the security of the object. For instance, the 3-D printing service associated with the payment object service 102 may utilize particular or special filaments to create the 3-D payment object 108. These filaments may be detectable under certain lighting conditions and may only be accessible to the payment object service 102 and unavailable to customers 104 or other entities. Alternatively, the 3-D printing service may incorporate into the 3-D payment object 108 one or more components capable of being detected through one or more short-range communication channels. The short-range communication channels may be established using various technologies, such as induction wireless, infra-red wireless (such as technologies operating according to specifications and protocols provided by the Infrared Data Association, or IrDA) or ultra wideband formats. In some embodiments, the integrated components may utilize short-range, low-power and high-frequency radio transmissions, such as Bluetooth®. In still other embodiments, the integrated components may support acoustic-based data transfer. For example, the integrated components may include software components and a speaker that enable the components to broadcast data to an authentication device (e.g., mobile device with installed applications associated with the payment object service 102, etc.) as sound waves, while the authentication device may include software components and microphone that enable the integrated components included within the 3-D payment object 108 to receive the data embedded in the sound waves. Thus, one or more of radio signal-based data transfer (e.g., near field communication (NFC) or Bluetooth®), light-based data transfer (e.g., infrared data transfer), an acoustic-based data transfer (e.g., sound wave-embedded data), or magnetic field-based transfer (e.g., reading data from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein. Generally, embodiments described herein are not limited to those explicitly illustrated herein.

Once the 3-D payment object 108 has been created and delivered to the customer 104 or other intended recipient, the 3-D payment object may be utilized for payment transactions, for adding value to a particular account associated with the payment object service 102, or for at least one mode of authentication (e.g., access to a particular service, such as the payment object service 102, a payment account, or to another service and/or authentication of a payment). For instance, in an embodiment, a customer 104 or recipient of the 3-D payment object 108 can utilize a mobile device 110 to scan the 3-D payment object 108 and provide scanned images of the 3-D payment object 108 to the payment object service 102 for verification. For example, a customer 104 or other recipient of the 3-D payment object 108 may utilize an application installed on the mobile device 110 to access a marketplace, where the customer 104 or other recipient of the 3-D payment object 108 may purchase goods and services from a merchant/retailer. This marketplace may be associated with the payment object service 102, such that the 3-D payment object 108 may be utilized in lieu of a fiat currency to purchase such goods and services. In order to utilize the 3-D payment object 108, the application may access one or more peripheral devices of the mobile device 110 to cause these peripheral devices to scan the 3-D payment object 108 and transmit information associated with the 3-D payment object 108 to the payment object service 102. For instance, the application may instruct the user of the mobile device 110 to capture one or more images of the 3-D payment object 108 from various angles. For example, the application may instruct the user to place the 3-D payment object 108 in front of a camera of the mobile device 110 and rotate the 3-D payment object 108 left-to-right, followed by top-to-bottom. The application may demonstrate to the user where to hold the 3-D payment object 108 while performing the aforementioned actions. Alternatively, the application may cause the mobile device 110 to emit a laser raster pattern that may be used to scan the 3-D payment object 108. The user may also utilize the mobile device 110 to capture discrete images of the 3-D payment object 108 or record a video of the 3-D payment object 108 as the user rotates the 3-D payment object 108 in various ways. While mobile devices 110 are used extensively throughout the present disclosure for the purpose of illustration, other computing devices, such as desktop computing devices, laptop computing devices, gaming devices with peripheral components usable to scan the 3-D payment object 108, point-of-sale devices, and the like, may be utilized to access the aforementioned marketplace and to scan the 3-D payment object 108.

In some embodiments, the application may require the customer 104 or other recipient of the 3-D payment object 108 to adjust one or more light sources to enable the mobile device 110 to capture one or more images of the 3-D payment object 108 under specific lighting conditions. For instance, the mobile device 110 may be configured to utilize different colored light sources to capture the one or more images of the 3-D payment object 108 for authentication. In other embodiments, the 3-D payment object 108 may include one or more unique features that may only be detected under certain lighting conditions, necessitating that the mobile device 110 be capable of projecting such lighting conditions to capture these unique features. For instance, the 3-D payment object 108 may include one or more features that are only detectable under ultraviolet or infrared light spectra. In order to capture these features for authentication of the 3-D payment object 108, the mobile device 110 may need to be configured to project ultraviolet or infrared light, as needed, to capture these unique features of the 3-D payment object 108.

When the payment object service 102 receives information associated with the 3-D payment object 108 from the mobile device 110, the payment object service 102 may analyze this information to determine whether the scanned 3-D payment object corresponds to an existing 3-D payment object that has been created by the payment object service 102 or has been created by a customer 104 utilizing his/her personal 3-D printing device 106 using specifications provided by the payment object service 102. For instance, the payment object service 102 may decompose the information provided into one or more vectors. These vectors may be compared to one or more vectors for registered 3-D payment objects to determine whether the scanned 3-D payment object 108 corresponds to one of these registered 3-D payment objects. If there is a match, the payment object service 102 may access a customer account associated with the registered 3-D payment object to determine the value of the 3-D payment object 108. In an alternative embodiment, the mobile device 110, through an application installed on the mobile device 110 associated with the payment object service 102, analyzes the information to determine whether the scanned 3-D payment object corresponds to the existing 3-D payment object. In such embodiments, the mobile device 110 may provide a cryptographic measurement of the code of the application that the mobile device 110 executes.

In some embodiments, the payment object service 102 may authenticate the recipient of the 3-D payment object 108 in order to enable the recipient to access the customer account associated with the object and utilize the payment value. This payment value may be applied to the present transaction, a future transaction or may be added to the recipient's account for later use. Further, once the payment value has been applied, the payment object service 102 may update the value of the 3-D payment object 108 by specifying the new value within the customer's account. It should be noted that in some embodiments, the payment object service 102 may be associated with one or more merchants or retailers, wherein the 3-D payment object may be redeemed. For instance, in order for the payment object 108 to be redeemed, a retailer or merchant may utilize a point-of-sale device to scan the payment object 108.

Figure 2:
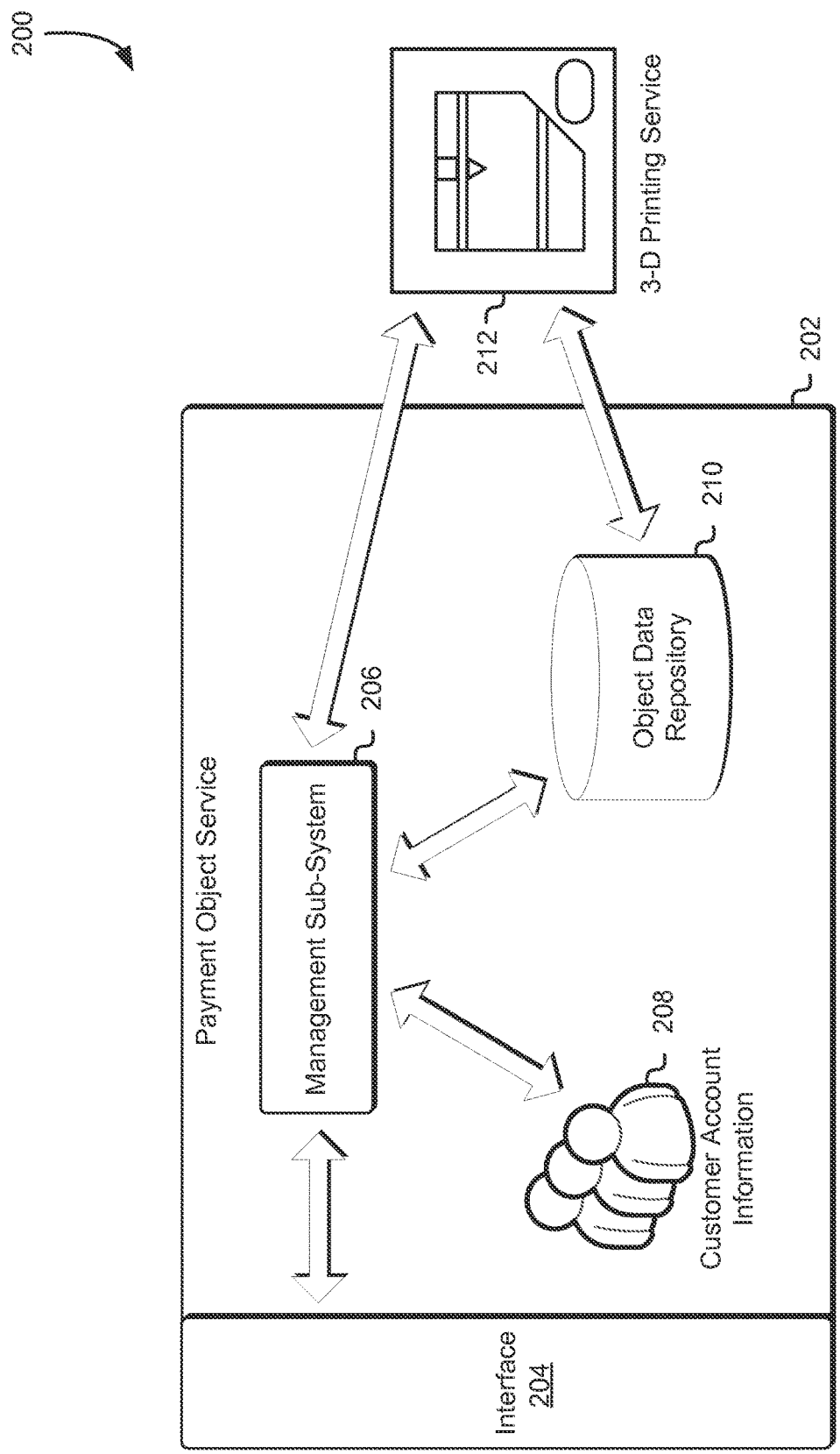
FIG. 2 shows an illustrative example of an environment that includes components of a payment object service configured to create three-dimensional payment objects in accordance with at least one embodiment.

As noted above, a customer may utilize a customer interface provided by the payment object service to request creation of a 3-D payment object. This 3-D payment object may be created utilizing a 3-D printing service associated with the payment object service and subsequently delivered to the customer or other recipient for use. Accordingly, FIG. 2 shows an illustrative example of an environment 200 that includes components of a payment object service 202 configured to create 3-D payment objects in accordance with at least one embodiment. The payment object service 202 may provide customers with an interface 204 that may enable a customer to access the payment object service 202. A customer may utilize the interface 204 through one or more communications networks, such as the Internet. The interface 204 may contain certain security safeguards to ensure that the customer has authorization to access the payment object service 202. For instance, in order to access the payment object service 202, a customer may need to provide a username and a corresponding password or encryption key when using the interface 204. Additionally, requests (e.g., API calls) submitted to the interface 204 may require an electronic signature generated using a cryptographic key such that the electronic signature is verifiable by the payment object service 202, such as by an authorization system (not shown).

Once a customer has gained access to the payment object service 202 through the interface 204, the payment object service 202 may allow the customer to interact, through the interface 204, with a management sub-system 206. For instance, the management sub-system 206 may enable the customer to select one or more images associated with 3-D objects that may be used to generate a new 3-D payment object. Alternatively, the management sub-system 206 may enable the customer to provide his/her own images, which the payment object service 206 may utilize to generate the 3-D payment object. The one or more images provided to the customer by the management sub-system 206, through the interface 204, may be obtained from an object data repository 210. The object data repository 210 may include one or more object files for each object that may be utilized as a 3-D payment object. For instance, the object data repository 210 may include, for each object provided by the payment object service 206, one or more image files that may be provided to a 3-D printing device to generate the 3-D payment object, one or more data files specifying various vectors that may be utilized to identify the 3-D payment object and the like.

In an embodiment, if the customer provides his/her own images that are to be utilized to generate the new 3-D payment object, the management sub-system 206 will analyze the one or more provided images to determine whether the desired 3-D payment object to be created is sufficiently unique. For instance, the management sub-system 206 may utilize one or more algorithms to decompose the provided one or more images into one or more vectors. The management sub-system 206 may access the object data repository 210 and compare the newly obtained one or more vectors to the known vectors for the one or more objects stored within the object data repository 210. If there is a match, then the 3-D payment object that is to be created may not be sufficiently unique. In such cases, the management sub-system 206 may modify the one or more provided images to include one or more distinguishing characteristics that may be utilized to render the 3-D payment object to be created sufficiently unique for use. For instance, in some embodiments, the management sub-system 206 may supplement the one or more provided images with a unique QR code, capacitive touch features (e.g., small extrusions detectable by placing the object on a capacitive surface), a secondary image and the like. Additionally, or alternatively, the management sub-system 206 may specify, within the provided one or more images, or in a compiled data file usable to print the 3-D payment object, that the 3-D payment object to be created is to include a unique RFID chip. For instance, the management sub-system 206 may specify, within these data files, the coordinates of the location where the RFID is to be located within the 3-D payment object.

Once the customer has either selected, through the interface 204, the one or more images that are to be utilized to generate the 3-D payment object or has provided his/her own images to the payment object service 202, the management sub-system 206 may access the customer account information data store 208 to access the customer's account and specify, within the account, the location of the one or more data files associated with the 3-D payment object stored within the object data repository 210. Further, the management sub-system 206 may specify, within the customer's account the payment value of the 3-D payment object and the identity of the intended recipient if other than the customer (e.g., another account identifier within the customer account information data store 208, recipient name and address, etc.).

In an embodiment, once the management sub-system 206 has updated the customer's account to indicate the location of the data files associated with the 3-D payment object and has prepared these data files for printing, the management sub-system 206 transmits a request to a 3-D printing service 212 to cause the 3-D printing service 212 to create the requested 3-D payment object. The 3-D printing service 212 may be associated with the payment object service 202. For instance, the payment object service 202 and the 3-D printing service 212 may both be provided by an entity, such as a retailer or merchant which may provide these services 202, 212 to its customers. The 3-D printing service 212 may be a collection of one or more 3-D printing devices, which may be utilized to create 3-D payment objects based at least in part on data files and/or specifications provided by the payment object service 202. For instance, as noted above, the management sub-system 206 may transmit the one or more data files and/or specifications associated with the 3-D payment object to be created to the 3-D printing service 212. Alternatively, the management sub-system 206 may transmit the location of the data files and/or specifications and enable the 3-D printing service 212 to access the object data repository 210 directly. The 3-D printing service 212 may also utilize particular media to create the 3-D payment object in a manner that may not be available to customers of the payment object service 202. For instance, the 3-D printing service 212 may include one or more 3-D printing devices that are configured to create 3-D payment objects using paper stock with various properties (e.g., color, thickness, coarseness, etc.), such as the 3-D printing devices provided by Mcor Technologies®. Alternatively, the one or more 3-D printing devices may be configured to create these 3-D payment objects utilizing edible media (e.g., chocolate, etc.), such as the 3-D chocolate printer manufactured by The Hershey Company®. In another instance, the 3-D printing service 212 may include one or more computer numerical controlled (CNC) machines, which may be utilized to create these 3-D payment objects. It should be noted that one or more additive manufacturing methods and/or subtractive manufacturing methods may be used to create at least a portion of the 3-D payment object.

The 3-D printing service 212, based at least in part on the specifications of the selected 3-D payment object, may identify one or more 3-D printing devices capable of producing the 3-D payment object. For instance, if the 3-D payment object is to be created using a particular color pigment that is unique to the payment object service 202 or customer, the 3-D printing service may identify one or more 3-D printing devices that are capable of utilizing this color pigment to create the 3-D payment object. Additionally, the 3-D printing service 212 may include a management sub-system of its own, which may be configured to queue any 3-D printing processes to provide expedient printing of 3-D payment objects. For instance, the 3-D printing service 212 may be able to identify any idle 3-D printing devices or 3-D printing devices with the lowest usage and transmit the request from the management sub-system 206 to these 3-D printing devices to expedite printing. Once the 3-D payment object has been printed by the 3-D printing service 212, the management sub-system 206 may activate the 3-D payment object and provide the object to the customer or intended recipient. For instance, if the 3-D payment object includes an RFID chip, the management sub-system 206 may activate the RFID chip to enable detection through one or more devices.

As will be described in greater detail below in connection with FIGS. 5 and 6, a customer or other intended recipient may utilize a mobile device or other peripheral device to scan the 3-D payment object and utilize the 3-D payment object for a payment transaction that may be processed by the payment object service 202. For instance, in an embodiment, a customer or intended recipient accesses the payment object service 202 through the interface 204 to request use of the 3-D payment object. In response to this request, the management sub-system 206, through the interface 204, may enable the customer or intended recipient to utilize his/her mobile device or other peripheral device to scan the 3-D payment object. For instance, the management sub-system 206, through the interface 204, may transmit one or more executable instructions to an application installed on the mobile device that may cause a camera installed on the mobile device to activate. The customer or recipient may be instructed to utilize the camera to capture images of the 3-D payment object, which may subsequently be uploaded to the payment object service 202 for analysis. While visual scans are utilized extensively throughout the present disclosure for the purpose of illustration, other methods may be utilized for verifying the authenticity of a 3-D payment object. For instance, in some embodiments, the 3-D payment object may be created with additional capacitive touch points. The customer or recipient may be instructed to place the 3-D payment object on a capacitive touch surface, such as a mobile device screen, such that the capacitive touch points may be detected and analyzed by the payment object service 202.

Once the management sub-system 206 has obtained the requisite information from the customer or intended recipient with regard to the 3-D payment object (e.g., scanned images, capacitive touch point imprints, etc.), the management sub-system 206 may access the object data repository 210 to determine whether the scanned 3-D payment object matches any known 3-D payment objects created by the payment object service 202. For instance, the management sub-system 206 may decompose the one or more received images into one or more vectors. These one or more vectors may be compared to the vectors of known 3-D payment objects to determine if there is a match. Once a match has been identified, the management sub-system 206 may be able to identify, within the customer account information data store 208, the specific customer account associated with the 3-D payment object to determine the current payment value of the 3-D payment object. This payment value may be applied to a present payment transaction, future payment transaction or added to the recipient's account for later use. Additionally, the management sub-system 206 may update the payment value of the 3-D payment object upon use.

Figure 3:
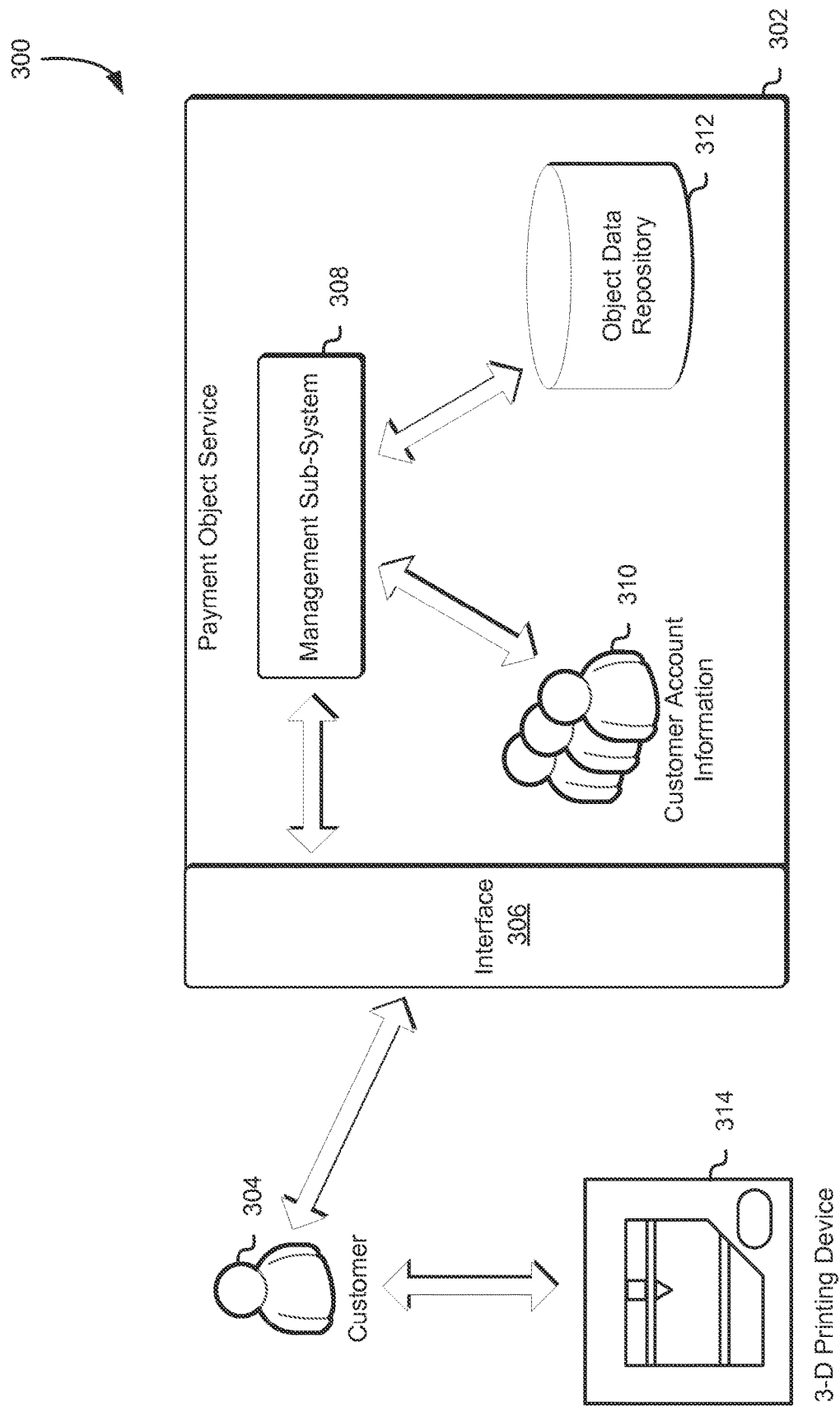
FIG. 3 shows an illustrative example of an environment that includes components of a payment object service configured to enable a customer to utilize a three-dimensional printing device to create three-dimensional payment objects in accordance with at least one embodiment.

As noted above, a customer of a payment object service may be able to utilize his/her own 3-D printing device to generate one or more 3-D payment objects for use with the payment object service. Accordingly, FIG. 3 shows an illustrative example of an environment 300 that includes components of a payment object service 302 configured to enable a customer 304 to utilize a 3-D printing device 314 to create 3-D payment objects in accordance with at least one embodiment. Similar to the payment object service described above in connection with FIG. 2, the payment object service 302 may provide customers 304 with an interface 306 that may enable a customer to access the payment object service 302. Through the interface 306, a customer 304 may specify that he/she would prefer to utilize his/her own 3-D printing device 314 to create the 3-D payment object.

The management sub-system 308 of the payment object service 302 may perform similar functions to those described above in connection with FIG. 2. For instance, the management sub-system 308, through the interface 306, may enable customers 304 to specify which images may be utilized to generate the 3-D payment object. These images may be provided by the management sub-system 308, such as through known object data stored within the object data repository 312, or by the customer 304 through the interface 306. If the images usable to create the 3-D payment object are provided by the customer 304, the management sub-system 308 may perform one or more analyses to determine whether the provided images are sufficiently unique to be usable to create a 3-D payment object. If not, the management sub-system 308 may update these images by incorporating one or more unique components, images or other unique feature that may be visible upon printing of the 3-D payment object. For instance, the management sub-system 308 may inject a QR code, capacitive touch points or other images into the provided images to generate new images usable to create the 3-D payment object.

Once the management sub-system 308 has updated the provided one or more images or has determined that the provided one or more images are unique, the management sub-system 308 may store these one or more images in an object data repository 312. However, if the customer 304 has specified that he/she is to utilize his/her own 3-D printing device 314 to print the 3-D payment object, the management sub-system 308, through the interface 306, may transmit the updated one or more images to the customer 304 for printing. Additionally, the management sub-system 308 may access the customer account information data store 310 to specify, within the customer's 304 account, the location of the one or more images and/or data files associated with the 3-D payment object within the object data repository 312.

The customer 304 may utilize the received one or more updated images or the original images if deemed to be unique by the management sub-system 308 to create the 3-D payment object utilizing his/her own 3-D printing device 314. Once the customer 304 has utilized the 3-D printing device 314 to generate the 3-D payment object, he/she may provide the object to another recipient, who may utilize the 3-D payment object for one or more payment transactions. Similar to the methods described above in connection to FIG. 2, the management sub-system 308 may analyze the 3-D payment object to ensure that it is indeed authentic and enable use of the 3-D payment object for any payment transactions.

In an embodiment, the customer 304 is required to utilize his/her computing device to scan the newly printed 3-D payment object and provide the scanned images of the object to the payment object service 302. The management sub-system 308 may evaluate the one or more received images and compare these to the available object information stored within the object data repository 312. If the 3-D payment object is sufficiently different (e.g., due to printing defects incorporates otherwise unanticipated physical features, etc.) from the appropriate object specified within the object data repository 312, the management sub-system 308 may, through the interface 306, request that the customer 304 specify whether these differences may be incorporated. If the customer 304 consents, the management sub-system 308 may store information about the 3-D payment object within the object data repository 312 and associate the payment amount to this object. Alternatively, the management sub-system 308 may reject the customer's 304 printed 3-D payment object and require that the payment object service 302 generate the 3-D payment object, as described above in connection with FIG. 2. This may enable the payment object service 302 to verify that the 3-D payment object created using the customer's 304 3-D printing device 314 either meets certain criteria for accuracy in creation and that the 3-D payment object may be used to redeem the associated payment value.

Figure 4:
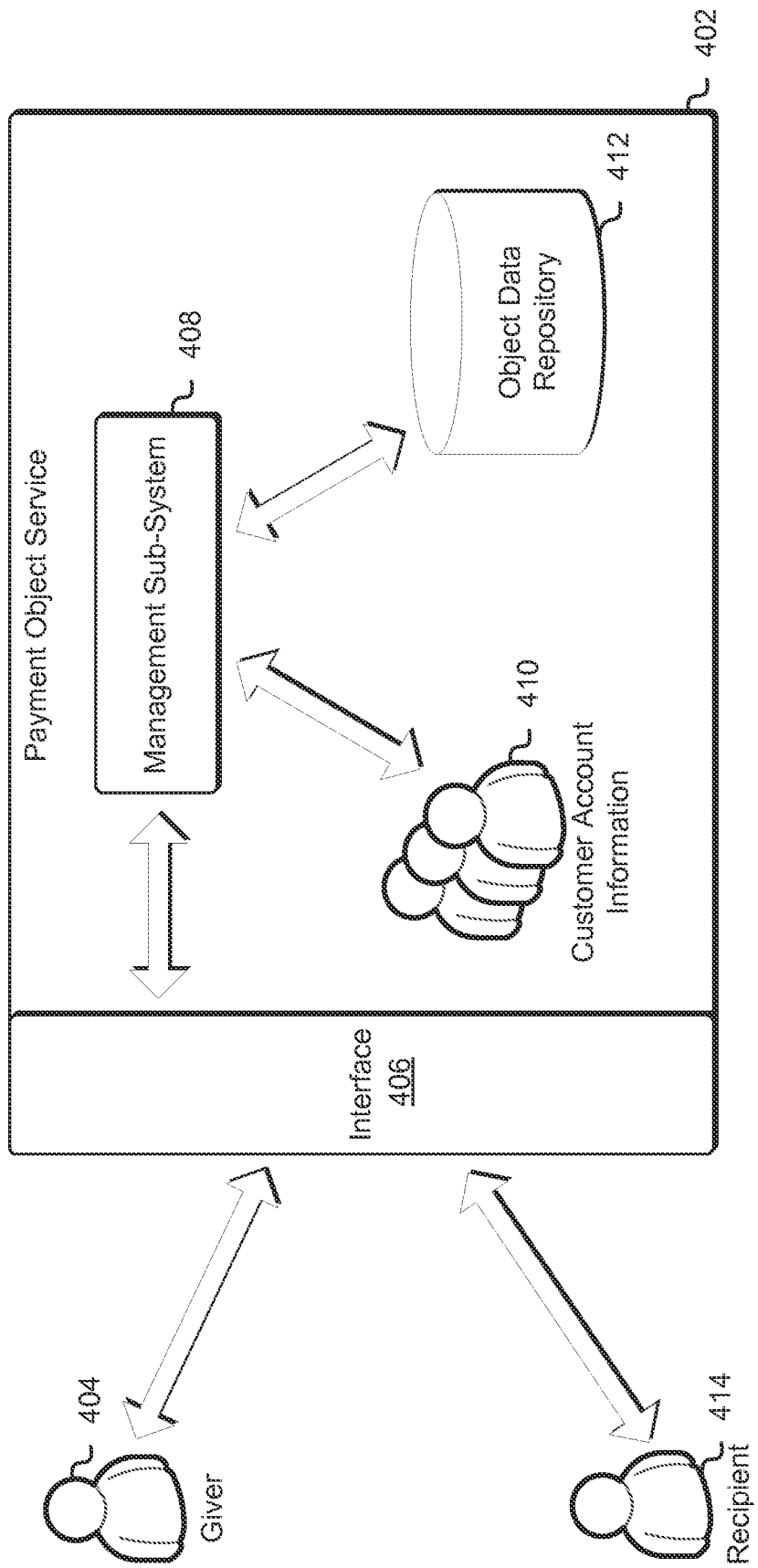
FIG. 4 shows an illustrative example of an environment that includes components of a payment object service configured to enable givers and recipients to create and redeem one or more payment objects, respectively, in accordance with at least one embodiment.

As noted above, customers of the payment object service may utilize an interface provided by the payment object service to access the payment object service. Such customers may be able to utilize the interface to request association of a payment amount to a particular object, which is to be provided to a recipient. Additionally, recipients of these objects may utilize the interface to request redemption of the payment amount that may be associated with an object. Accordingly, FIG. 4 shows an illustrative example of an environment 400 that includes components of a payment object service 402 configured to enable givers 404 and recipients 414 to create and redeem one or more payment objects, respectively, in accordance with at least one embodiment. The givers 404 and recipients 414 of a payment object may be customers of the payment object service 402. Similar to the payment object service described above in connection with FIGS. 2 and 3, the payment object service 402 may provide givers 404 and recipients 414 with an interface 406 that may enable these customers to access the payment object service 402. For instance, through the interface 406, a giver 404 may provide the payment object service 402 with one or more scanned images of an object that the giver 404 would like to utilize as a payment object.

Once the giver 404 has provided, through the interface 406, the one or more scanned images of the object and has specified the payment amount that is to be applied to the object, the management sub-system 408 may access an object data repository 412 to determine whether the scanned object matches any known objects selected by other givers 404 through the payment object service 402. For instance, the management sub-system 408 may decompose the one or more received images into one or more vectors. Note that the management sub-system or another system (e.g., a mobile device, in some embodiments) that analyses an object (e.g., by analyzing images of the object) may utilize a secure processor (e.g., a trusted platform module or a processor implementing Intel Secure Guard Extension (SGX) technology) to provide a cryptographic measurement (e.g., attestation) of code being executed to analyze the object (e.g., to determine one or more non-alphanumeric features). In this manner, another system or component of a system may utilize the cryptographic measurement to ensure that analysis of the object was performed in accordance with code that is in an approved state (e.g., code that has not been altered). Returning to the illustrated embodiment, these one or more vectors may be compared to the vectors of known objects to determine if there is a match. If the management sub-system 408 determines, through this analysis, that there is a match within the object data repository 412, the management sub-system 408 may deem the scanned object to be non-unique and transmit, through the interface 406, a request to the giver 404 to provide additional recipient 414 information for the object. This additional recipient 414 information may be recorded within a customer account information data store 410, wherein the scanned object may be associated with the recipient 414. If the management sub-system 408 determines that there are no matching objects specified within the object data repository 412, the management sub-system 408 may add the provided scanned images of the object provided by the giver 404 to the object data repository 412 and associate the requested payment amount to the object.

In an alternative embodiment, a giver 404 can select, through the interface 406, an object that may be used as a payment object. For instance, the payment object service 402, in some embodiments, may serve as a marketplace, wherein customers may purchase one or more items through the interface. The giver 404 may select an object made available by the payment object service 402 and specify a payment amount that should be associated with the object. Additionally, the giver 404 may specify, through the interface 406, any recipient 414 information that may be used to associate the payment object with the recipient 414 and enable redemption of the payment amount associated with the object. This recipient 414 information may be recorded within the customer account information data store 410.

Once the management sub-system 408 has recorded the scanned images of the object within the object data repository 412 or has received the pertinent recipient information 414 from the giver 404, the management sub-system 408 may notify the giver 404 that the scanned object may now be utilized as a payment object. This may enable the giver 404 to provide the scanned object to the recipient 414. Alternatively, if the giver 404 selected the object through the interface 406, the payment object service 402 may cause the payment object to be delivered to the recipient 414, along with instructions for redemption of the payment amount associated with the payment object.

When a recipient 414 receives the payment object from either the giver 404 or the a delivery service associated with the payment object service 402, the recipient 414 may access the interface 406 to redeem the payment amount associated with the payment object. For instance, in an embodiment, the recipient 414 uses a mobile device or other device to scan the payment object and upload, through the interface 406, the scanned images of the payment object to the payment object service 402. The management sub-system 408 may access the object data repository 412 to determine whether the scanned object matches any known payment objects specified within the object data repository 412. If there is a match, and the scanned object is unique, the management sub-system 408 may enable the recipient 414, through the interface 406, to redeem the corresponding payment amount and, based at least in part on the amount redeemed, update the remaining payment amount that is associated with the object.

If there is a match, but the payment object is not unique, the management sub-system 408 may utilize any recipient 414 information provided by the recipient 414 through the interface 406 to determine if the payment object has been associated with the particular recipient 414. For instance, the management sub-system 408 may access the customer account information data store 410 and utilize the received recipient 414 information to identify a corresponding recipient 414 account. The recipient 414 account may specify which payment objects detailed within the object data repository 412 are associated with the recipient 414 and the payment amount attached to each of these payment objects. If the recipient 414 account does not specify the scanned payment object, the management sub-system 408 may, through the interface 406, reject the recipient's 414 request to redeem the payment amount associated with the payment object. However, if the recipient 414 account does specify the scanned payment object, the management sub-system 408 may enable the recipient 414, through the interface 406, to redeem any of the payment amount that is associated with the payment object.

As noted above, a customer may be able to utilize an interface provided by the payment object service to access the payment object service and request creation of a 3-D payment object. Through this interface, a customer may be able to select from one or more default designs provided by the payment object service or upload his/her own images which may be used to generate the 3-D payment object. Further, the customer may specify, through the interface, whether the payment object service should create the 3-D payment object or the customer may utilize his/her own printing device. Accordingly, FIG. 5 shows an illustrative example of an environment 500 that includes an interface 502 that can be utilized to select a design for a 3-D payment object and that is configured to cause the 3-D payment object to be created in accordance with at least one embodiment.

Figure 5:
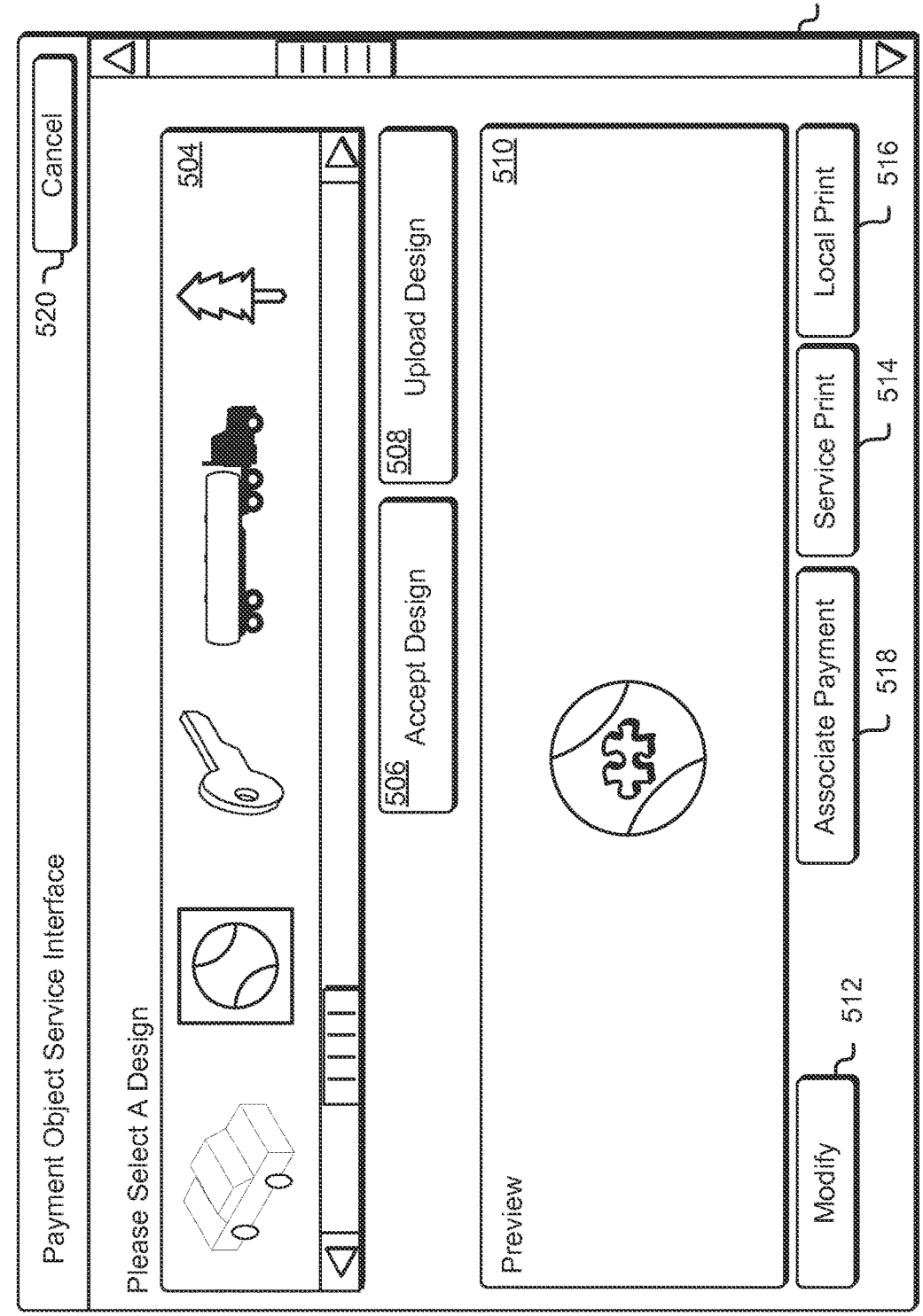
FIG. 5 shows an illustrative example of an environment that includes an interface that can be utilized to select a design for a three-dimensional payment object and that is configured to cause the three-dimensional payment object to be created in accordance with at least one embodiment.
Figure 6:
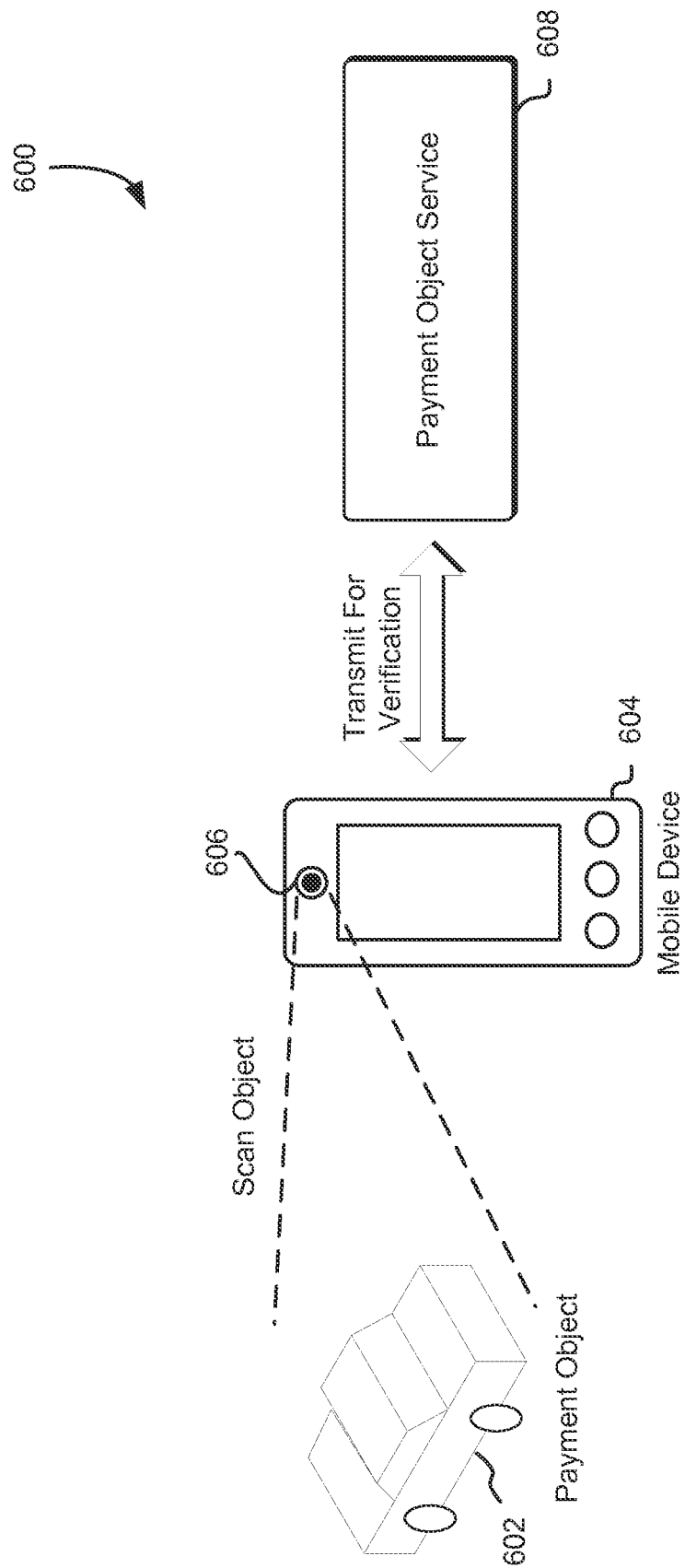
FIG. 6 shows an illustrative example of an environment in which a three-dimensional payment object is scanned for verification and use in accordance with at least one embodiment.

The interface 502 may include one or more components which may enable a customer to request creation of a 3-D payment object, although not all embodiments may include all the components illustrated in FIG. 5 and may include additional or alternative elements. The interface 502 may include a design selection window 504, which may include one or more images that may be utilized to generate a 3-D payment object. The one or more images illustrated within the design selection window 504 may be selected by the payment object service based at least in part on the one or more images stored within the object data repository. A customer may utilize the design selection window 504 to select, such as through use of a cursor or other interaction device, an image for use in creating the 3-D payment object. Once the customer has selected an image from the design selection window 504, the customer may select the accept design button 506 to confirm his/her selection.

Alternatively, if the customer does not want to use any of the presented designs, the customer may select the upload design button 508. If the customer selects the upload design button 508, the payment object service may cause the interface to display a dialogue box, which may be configured to cause the customer's computing device to display the contents of his/her computing device. This may enable the customer to select the appropriate one or more images for use in creating the 3-D payment object. Alternatively, in an embodiment, selecting the upload design button 508 may cause the payment object service to transmit one or more executable instructions to the customer's computing device that may cause the computing device to activate a camera or other scanning device. This may enable the customer to scan the desired object and generate one or more images that may be utilized for creating the 3-D payment object or associated a payment amount to the scanned object to convert the scanned object into a 3-D payment object.

Once the customer has either selected a design from the design selection window 504 or has uploaded his/her own design by utilizing the upload design button 508, the payment object service may populate a design preview window 510 with an illustration that may be representative of the 3-D payment object to be created. For instance, as illustrated in FIG. 5, the customer has selected a ball design from the design selection window 504 and has accepted the design by utilizing the accept design button 506. In response to this, the payment object service has populated the design preview window 510 with a pictorial representation of the selected ball. Additionally, the payment object service has added an additional component to the pictorial representation of the ball, which may be present when the 3-D payment object is created. This additional component may be a unique identifier, which may be used to distinguish this 3-D payment object from other 3-D payment objects. For instance, as noted above, if the design uploaded by the customer is not sufficiently unique, the payment object service may modify the provided design to incorporate one or more unique features that may render the 3-D payment object unique. Alternatively, if the customer has selected a design from the design selection window 504, the payment object service may incorporate these unique features to distinguish the 3-D payment object from other objects created using the same design template. It should be noted that these unique features may be features that correspond to information that is unique to a database of the payment object service. For example, the payment object service may modify the provided 3-D model to include a unique code, which, when the 3-D payment object is created, may be incorporated into the object. If the 3-D payment object is reproduced multiple times, the code may also be reproduced this number of times. However, the code may still be considered unique since this code may correspond to a unique entry within a database of the payment object service. Thus, the 3-D payment object including this code, regardless of how many copies of the object may exist, may only be redeemed once.

The payment object service interface 502 may include a modify button 512, which a customer may utilize to modify the design of the 3-D payment object illustrated in the design preview window 510. For instance, if the customer selects the modify button 512, the payment object service may cause the interface 502 to present the customer with a new design window, which may include one or more tools usable by the customer to manipulate the design of the 3-D payment object. For example, a customer may be able to change the size and location of the unique identifier of the 3-D payment object and, in some embodiments, provide additional details that may be incorporated into the design. Once the customer has completed modifying the design, the payment object service may perform additional analyses to determine whether the modified design is still sufficiently unique for use. If not, the payment object service may again modify the design to ensure uniqueness.

Once the customer is satisfied with the design of the 3-D payment object, the customer may either select a service print button 514 or a local print button 516 to have the 3-D payment object created by the payment object service or through the customer's own 3-D printing device, respectively. If the customer selects the service print button 514, the payment object service may transmit a request to a 3-D printing service to cause the 3-D payment object to be created. Additionally, the payment object service may notify the customer, through the interface 502, the estimate delivery time of the 3-D payment object to the intended recipient.

The payment object service interface 502 may further include an associate payment button 518, which may be used to associate a payment amount, as specified by the customer, to an uploaded design. For instance, if the customer, through selection of the upload design button 508, has specified that he/she wants to associate a payment amount to a scanned object such that the scanned object may be utilized as a 3-D payment object, the customer may select the associate payment button 518 to access a payment amount window (not shown) to specify the payment amount to be associated with the scanned object. Further, if the payment object service determines, based at least in part on the one or more scanned images of the object that the object is not unique, the payment object service may require that the customer provide additional recipient information that may be association with the object to create a unique association that can be used to associate the payment amount.

Once the customer has selected the associate payment button 518, the service print button 514 or the local print button 516, the payment object service interface 502 may enable the customer to schedule delivery of the 3-D payment object to the recipient. Additionally, the customer, through the interface 502, may provide a greeting that may be given to the recipient with the 3-D payment object upon delivery. In some embodiments, if the customer has selected the associate payment button 518 to utilize an object of his/her choosing as the 3-D payment object, the customer may prepare, through the interface 502, a shipping label which may be used to enable the customer to deliver the 3-D payment object through a postal or other shipping service.

The payment object service interface 502 may include one or more additional or alternative interface devices, which may be utilized by a customer for various purposes. For instance, as illustrated in FIG. 5, the interface 502 may include a cancel button 520, which may enable the customer to cancel any selections made within the interface 502. Additionally, selection of the cancel button 520 may cause the interface 502 to terminate and further terminate the connection between the customer and the payment object service.

As noted above, a customer or intended recipient of a payment object may be required to scan the payment object and provide one or more images produced through this scan to the payment object service for verification and use. Accordingly, FIG. 6 shows an illustrative example of an environment 600 in which a payment object is scanned for verification and use in accordance with at least one embodiment. The payment object 602, as described above, may include any object (unique or non-unique) that may be created by a customer or a payment object service 608 utilizing a 3-D printing device or obtained by a customer through a retail merchant, personal inventory or other means. In an embodiment, the payment object 602 can be a recipient himself/herself. For instance, if a giver has specified that a payment amount be associated with a particular contact, such as through one or more photographs or other identifiable information of the recipient, the payment object service 608 may associate the payment amount with this identifiable information of the recipient.

In order to redeem the payment amount that may be associated with the payment object 602, a recipient may be required to utilize his/her mobile device 604 to scan the payment object 602 and obtain one or more images that may be used for verification. The mobile device 604 may include an installed application, which may provide an interface for communicating with the payment object service 608. For instance, the application may include one or more graphical user interfaces (GUI) which may enable the recipient to upload these one or more images to the payment object service 608. Additionally, the mobile device 604 may provide any pertinent recipient information to the payment object service 608. This information may be used by the payment object service 608 to verify the identity of the recipient. The mobile device 604 may further include one or more peripheral devices, such as a camera 606, which may be used to scan the payment object 602. For instance, the payment object service 608, through the application installed on the mobile device 604, may require that the recipient scan the payment object 602 from one or more angles. This may assist the payment object service 608 to verify the payment object 602.

Once the mobile device 604 has been utilized to scan the payment object 602, the mobile device 604 may transmit, through one or more communications networks, the scanned images of the payment object 602 to the payment object service 608 for verification. As noted above, the payment object service 608 may utilize these scanned images to determine if the payment object 602 can be identified through the object data repository and, if so, determine if the payment object 602 is associated with the recipient. If the scanned payment object 602 cannot be identified through the object data repository or is not associated with the recipient, the payment object service 608 may deny the request to redeem the payment amount from the payment object 602. Alternatively, if there is a match and the payment object 602 is associated with the recipient, the payment object service 608 may, through the application installed on the mobile device 604, enable the recipient to redeem any or the entire payment amount.

Figure 7:
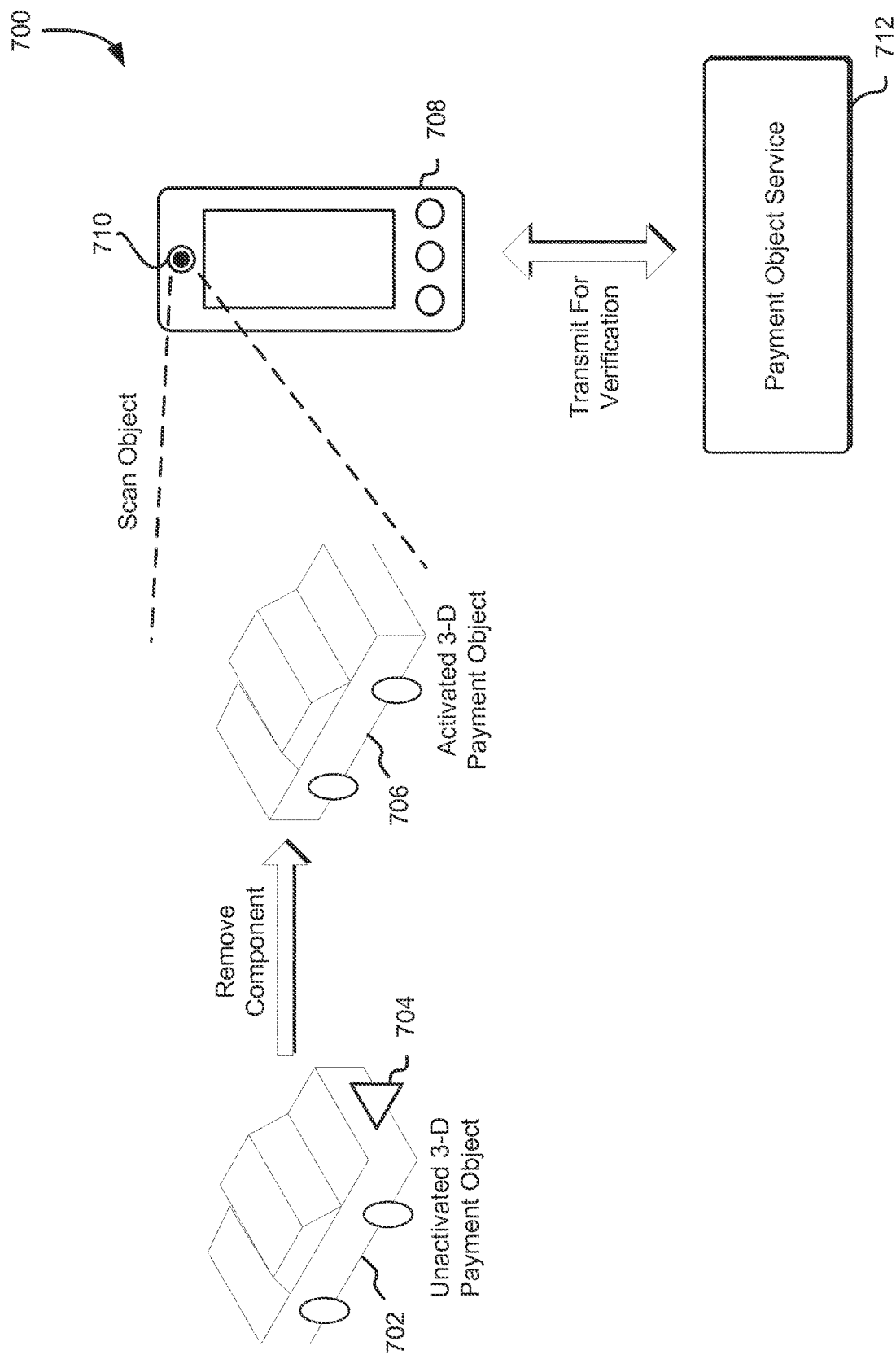
FIG. 7 shows an illustrative example of an environment in which a three-dimensional payment object is activated for use by removing a component of the three-dimensional payment object in accordance with at least one embodiment.

In some embodiments, the payment object service may generate one or more 3-D payment objects comprising additional components that must be removed before the 3-D payment objects may be activated for use. Accordingly, FIG. 7 shows an illustrative example of an environment 700 in which a payment object is activated for use by removing a component of the payment object in accordance with at least one embodiment. In the environment 700, a recipient or other entity may receive an unactivated payment object 702, which may include an activation component 704 usable to activate the payment object. For instance, if a recipient or other entity attempts to redeem the payment amount associated with the payment object by utilizing a camera 710 on a mobile device 708 to scan the unactivated payment object 702, the payment object service 712 may deny the request to redeem the payment amount. For instance, the unactivated payment object 702 may not be specified within the object data repository of the payment object service 712, resulting in the payment object service 712 being unable to identify the unactivated payment object 702. Alternatively, the mobile device 708, if it includes an application associated with the payment object service 712 for uploading one or more scanned images of the payment object, may determine that that unactivated payment object 702 has not been activated and deny the request without having to transmit the scanned images of the unactivated payment object 702 to the payment object service 712.

When the recipient or other entity removes the activation tab 704 or other removable feature from the unactivated payment object 702, the payment object may become recognizable by the payment object service 712 and, thus, usable to redeem the payment amount associated with the payment object. In some embodiments, the activation tab 704 may serve to conceal a unique feature of the payment object, such as a bar code, quick response (QR) code or other feature that may cause the payment object service 712 to be able to identify the payment object and the associated payment amount. For instance, when a recipient or other entity removes the activation tab 704, the recipient or other entity may utilize a camera 710 installed on a mobile device 708 or other device to scan the now activated payment object 706. The mobile device 708 may transmit the images of the scanned activated payment object 706 to the payment object service 712 for verification.

The payment object service 712 may access the object data repository and utilize the received images to determine whether the scanned activated payment object 706 corresponds to any known payment objects. Particularly, the payment object service 712 may utilize the one or more unique features from the activated payment object 706 to identify a match within the object data repository. If a match is identified, the payment object service 712 may enable the recipient of the activated payment object 706 to redeem any or the entire payment amount associated with the activated payment object 706.

Figure 8:
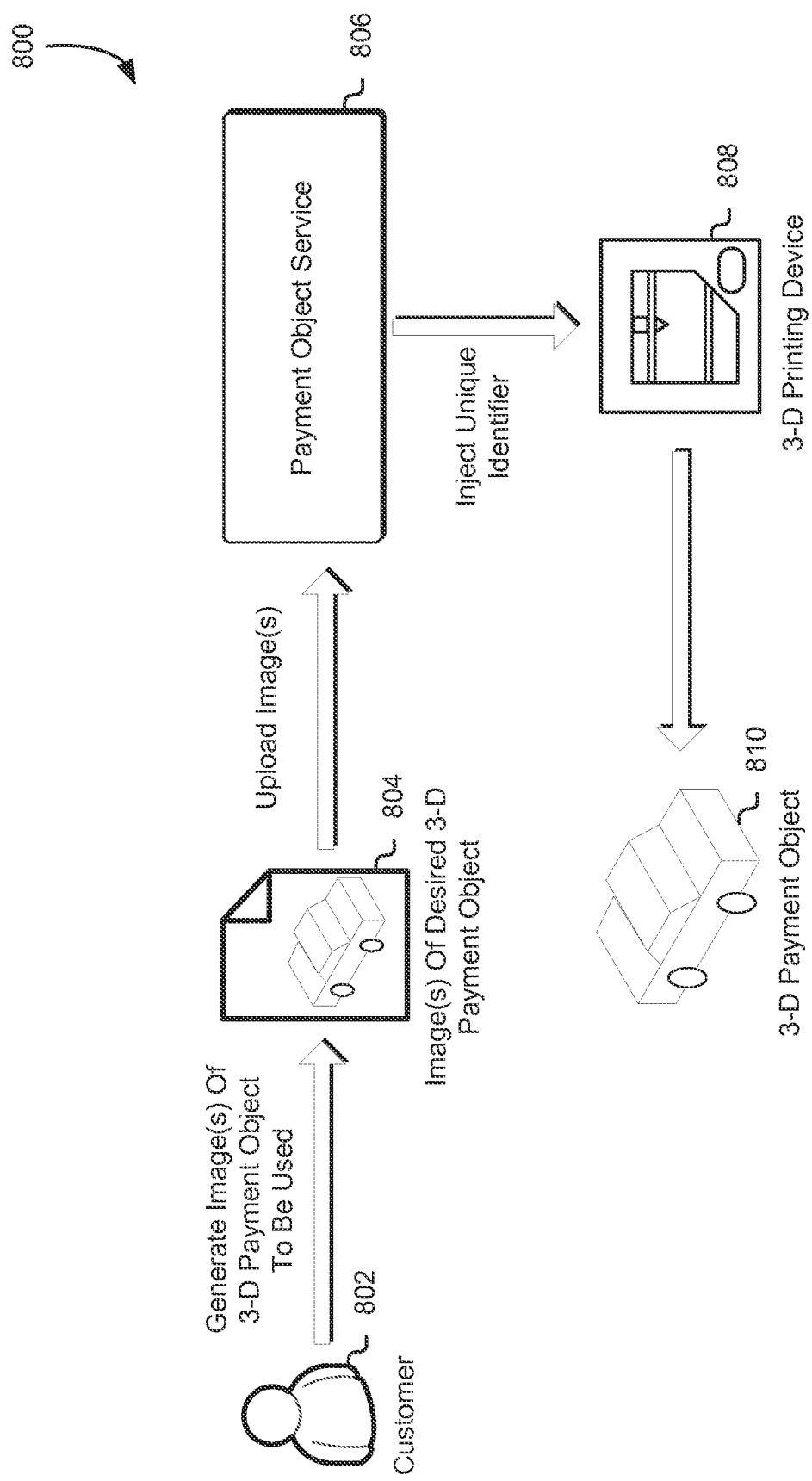
FIG. 8 shows an illustrative example of an environment in which a customer provides one or more images to a payment object service that can be used to generate a three-dimensional payment object in accordance with at least one embodiment.

As noted above, a customer may provide a payment object service with one or more images which may be used to generate a new 3-D payment object. The customer may, through the payment object service, specify the payment amount that is to be associated with the 3-D payment object and other information, such as the intended recipient of the payment object, to make the 3-D payment object unique. Accordingly, FIG. 8 shows an illustrative example of an environment 800 in which a customer 802 provides one or more images 804 to a payment object service 806 that can be used to generate a three-dimensional payment object 810 in accordance with at least one embodiment. In an embodiment, a customer 802 utilizes one or more visual recording devices (e.g., camera or video recorder) to generate one or more images 804 of an object that the customer 802 would like to be used to generate a new payment object. The images 804 may include pictorial representations of an object at various angles, sufficient for determining the dimensions and features of the object. For instance, the one or more images 804 may illustrate one or more perspectives of the object such that these images may be used to determine the uniqueness of the object and to generate the 3-D payment object 810. Alternatively, the one or more images 804 may be a seamless video showing various perspectives of the object.

Once the customer 802 has obtained the one or more images 804 of the desired payment object, the customer 802 may upload these images to a payment object service 806 in order to associate a payment amount to the desired payment object. The payment object service 806 may analyze the received images to determine if the desired payment object is unique. For instance, in some embodiments, the payment object service 806 may decompose the received one or more images into one or more vectors based at least in part on the one or more identified contours of the desired object illustrated in the one or more images 804. The payment object service 806 may access an object data repository and compare these one or more vectors to other known vectors for other 3-D payment objects to determine whether the desired 3-D payment object to be created is unique. If the desired 3-D payment object is not unique, the payment object service 806 may modify the received one or more images to introduce one or more unique components that may be incorporated into the 3-D payment object 810. The payment object service 806 may store these modified images within the object data repository for later use by the customer 802 and for verification of the 3-D payment object 810 once activated.

The payment object service 806, upon storing the one or more images 804 within the object data repository, may provide these images 804 to a 3-D printing device 808 to enable creation of the 3-D payment object 810. For instance, the payment object service 806 may provide the one or more images 804 of the desired payment object to a 3-D printing service, which may identify one or more 3-D printing devices 808 to be utilized for creation of the 3-D payment object 810. Alternatively, if the customer 802 has specified that he/she will utilize his/her own 3-D printing device 808 to create the 3-D payment object 810, the payment object service 806 may provide the modified one or more images 804 to the customer 802 for use with his/her own 3-D printing device 808. These one or more images 804 may illustrate one or more perspectives of the 3-D payment object 810 to be created. Once the 3-D payment object 810 has been created, the customer 802 may provide the 3-D payment object 810 to a recipient for use. In an embodiment, the images 804 are schematic diagrams that may be printed in two-dimensional media but, when assembled, may result in a 3-D object. This 3-D object may be used at the 3-D payment object 810 once assembled. In other embodiments, the 3-D payment object 810 may include a 3-D rendering, wherein a two-dimensional image includes 3-D photorealistic effects. These may include holograms, images created using perspective projection and the like.

Figure 9:
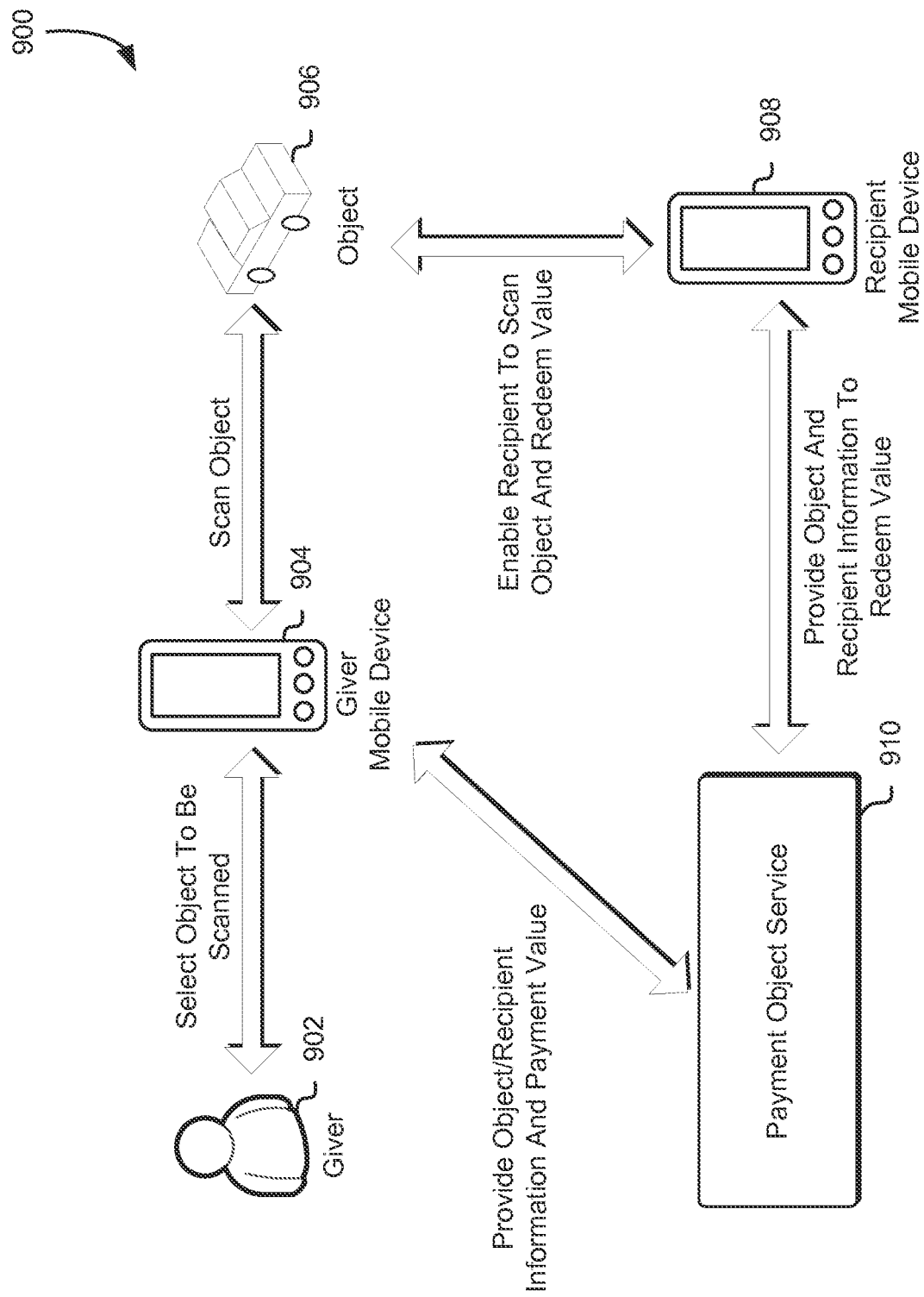
FIG. 9 shows an illustrative example of an environment in which a giver provides a payment object service with object and recipient information to associate a payment value with a non-unique object in accordance with at least one embodiment.

As noted above, a giver of a payment object may select a non-unique object that may be utilized as a payment object and provided to a recipient for use. In order to turn the non-unique object into a payment object with an associated payment amount, a giver of the payment object may be required to not only provide images of the non-unique object, but also recipient information that may be associated with the non-unique object to create a unique association. Accordingly, FIG. 9 shows an illustrative example of an environment 900 in which a giver 902 provides a payment object service 910 with object 906 and recipient information to associate a payment value with a non-unique object 906 in accordance with at least one embodiment. In the environment 900, a giver 902 may utilize a mobile device 904 to scan a particular non-unique object 906 that he/she wants to utilize as a payment object. For instance, the non-unique object 906 may be a mass-produced product that is readily available for use.

Once the giver 902 has utilized his/her mobile device 904 to scan the non-unique object 906, the giver 902 may access a payment object service 910 to request that a payment amount be associated with the non-unique object 906. The giver 902, through the mobile device 904 or any other computing device, may transmit to the payment object service 910 the images of the scanned object 906 and recipient information that may be used to associate the non-unique object 906 with a recipient and render the association unique. The request may specify the recipient information by including the recipient information within the request, referencing one or more databases that specify the recipient information, or by the request being directly associated with the recipient information. The payment object service 910 may store the received one or more images within an object data repository and the associated recipient information within a customer account information data store, wherein the recipient account may specify this received information, the associated non-unique object 906, the payment amount applied to the object 906 and other information that may be usable to identify the payment object.

In an embodiment, the payment object service 910 includes a database configured to associate instances of recipient information and corresponding objects. For instance, when the payment object service 910 receives the one or more images of the scanned object 906 and the recipient information, the payment object service 910 may access this database to create an entry corresponding to the particular object. Further, for this entry, the payment object service 910 may include the corresponding recipient information. This may allow the database to associate the recipient information and the corresponding object. The association within the database may be created in various ways, such as associating recipient information with a product identifier; associating recipient information with the one or more images of the object; associating the recipient information with particular features of the object (e.g., object serial number, etc.); and the like. Recipient information may include a recipient account identifier, e-mail address of the recipient, username of the recipient for a different service (e.g., social networking services), biometric information, etc. While recipient information is used extensively throughout the present disclosure for the purpose of illustration, other information that is to be associated with the object 906 may be used. For instance, other information may include other objects (e.g., a complimentary component to the non-unique object 906), a secret code that may be provided to the recipient, information associated with the giver 902 and the like. In an embodiment, the recipient information and object 906 information stored within the database may be transformed using a one-way function or otherwise based, at least in part, on a one-way function, such as a cryptographic hash function, message authentication code algorithm, or a key derivation function. It should be noted that the phrase "one-way function" includes functions that are not necessarily one-way in the strict mathematical sense, but that exhibit properties (such as collision resistance, pre-image resistance and second pre-image resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. The association between the recipient information and object 906 information may be created by way of storing output of the one-way function in association with the payment amount.

The payment object service 910 may notify the giver 902 and confirm that the payment amount has been successfully associated with the non-unique object 906. This may enable the giver 902 to provide the non-unique object 906 to the intended recipient. Further the giver 902 may provide the recipient with instructions on how to redeem the payment amount associated with the non-unique object 906. For instance, the recipient may download an application on to his/her mobile device 908, which may be used to access the payment object service 910 and provide the payment object service 910 with one or more images of the non-unique object 906 and associated recipient information. For example, the recipient may utilize his/her mobile device 908 to scan the received non-unique object 906 and generate one or more images of the object 906. The recipient may subsequently utilize the application installed on the mobile device 908 to select the obtained images and other recipient information that is to be provided to the payment object service 910.

In response to receiving the images of the non-unique object 906 and the recipient information from the mobile device 908, the payment object service 910 may access the object data repository to determine whether there is a known payment object that matches the images of the scanned non-unique object 906. If there is no match, then the payment object service 910 may reject the recipient's request to redeem the payment value associated with the object 906. Alternatively, if there is a match, the payment object service 910 may access the customer account information data store to access the recipient account (if available) and determine whether the non-unique object 906 is associated with the recipient. If so, the payment object service 910 may enable the recipient to redeem the payment amount associated with the non-unique object 906 and update the account based at least in part on this redemption.

Figure 10:
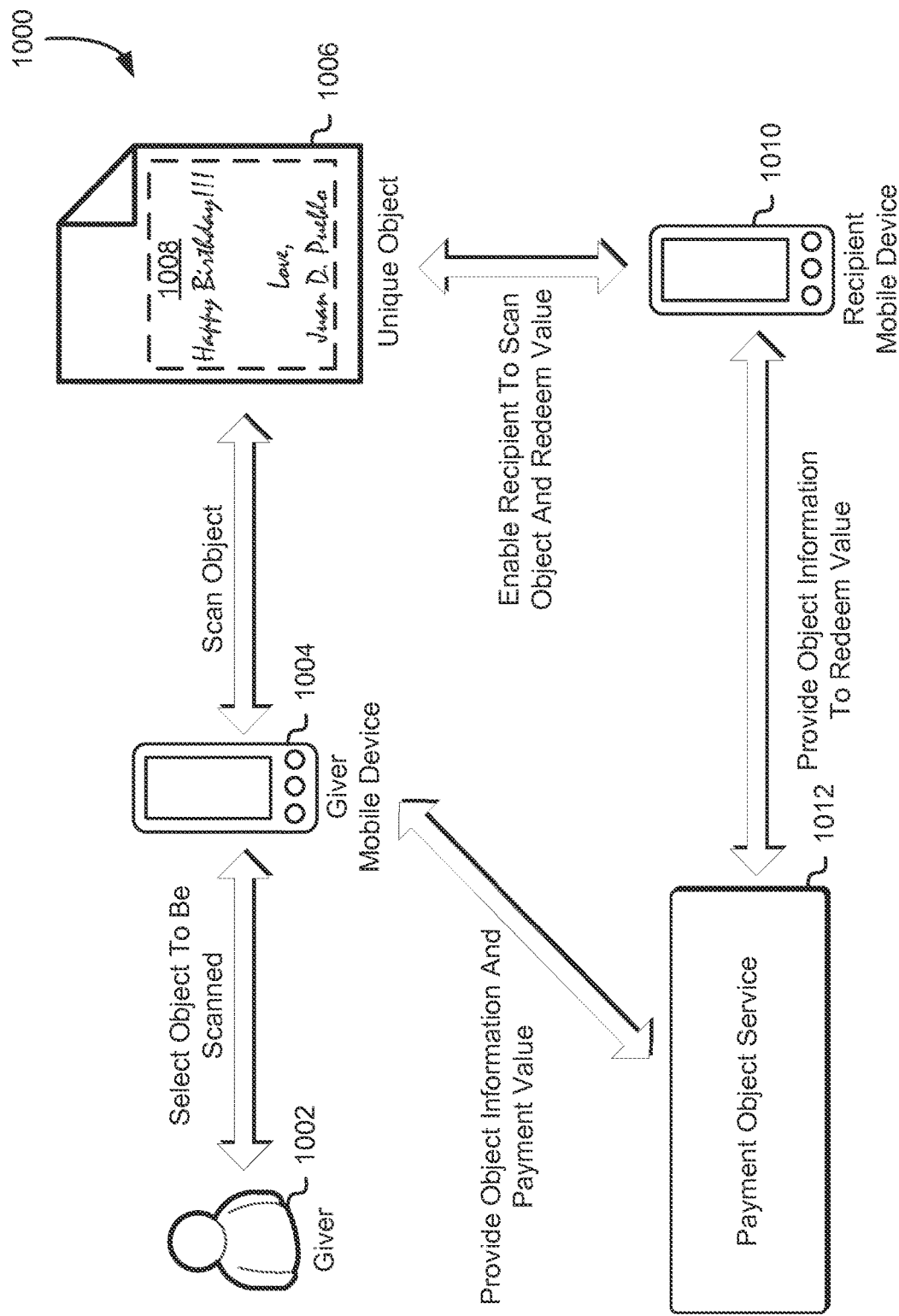
FIG. 10 shows an illustrative example of an environment in which a giver provides a payment object service with object information to associate a payment value with a unique object in accordance with at least one embodiment.

As noted above, a giver of a payment object may access a payment object service to associate a payment amount to a unique object. This unique object may be provided to a recipient, which may scan the unique object and access the payment object service to redeem the associated payment amount. Accordingly, FIG. 10 shows an illustrative example of an environment 1000 in which a giver 1002 provides a payment object service 1012 with object information to associate a payment value with a unique object 1006 in accordance with at least one embodiment. In the environment 1000, a giver 1002 may utilize a mobile device 1004 or other computing device, to scan a unique object 1006 that is to be used as a payment object. The unique object 1006 may include any number of unique alphanumeric and non-alphanumeric features that may distinguish it from other objects. In some embodiments, the unique object 1006 may further include any number of unique non-physiological features. For instance, as illustrated in FIG. 10, the unique object 1006 may include a handwritten note 1008 in the handwriting of the giver 1002. This handwritten note 1008 may include one or more handwritten elements (e.g., signatures, statements, etc.), which may be extracted by the payment object service 1012 to analyze the handwritten note 1008 and determine whether it has any unique non-alphanumeric features. While a handwritten note 1008 is included to demonstrate the uniqueness of an object 1006 within this disclosure, it should be noted that other features may render an object to be unique. Additionally, the unique object 1006 may be any two-dimensional or three-dimensional object that has one or more unique elements that may be used to distinguish the two-dimensional or three-dimensional object from other objects. For instance, a 3-D object may include a one-of-a-kind feature, item or other component that may be unique to that 3-D object. It should also be noted that the unique object 1006 may be inanimate or, in some instances, include one or more movable components or mechanisms.

In some embodiments, the unique object 1006 may be associated with a non-unique object, such that a giver 1002 may utilize a mobile device 1004 or other computing device, to not only scan the unique object 1006 but also the non-unique object. The non-unique object, in conjunction with the unique object 1006, may be utilized as the payment object. For instance, as will be described in greater detail below, a recipient utilizing his/her mobile device 1010 may be required to scan both the unique object 1006 and the non-unique object to enable the payment object service 1012 to determine whether the association between the unique object 1006 and the non-unique object corresponds to a payment value and, if so, enable the recipient to redeem the associated payment value. In some embodiments, the unique object 1006 may include recipient information, such as one or more representations of features of the recipient, which may be determined through a photographic image of the recipient. The recipient utilizing his/her mobile device 1010 may be required to upload a photographic image of himself/herself and scan the non-unique object. The photographic images of the recipient and the scanned images of the non-unique object may be uploaded to the payment object service 1012, which, in combination, may be utilized for redemption of the payment value corresponding to the non-unique object.

Once the giver 1002 has scanned the unique object 1006, the giver 1002, through his/her mobile device 1004, may access a payment object service 1012 to upload the images of the unique object 1006 and request attachment of a payment value to the unique object 1006. In some embodiments, the unique object 1006 may be an object that, while not truly unique, may not have been previously recorded by the payment object service 1012. For example, a giver 1002 may select, as the unique object 1006, a mass-produced toy manufactured in Guinea-Bissau. While this toy may be mass-produced in that particular country, the payment object service 1012 may record the object as unique, since it has not recorded a similar object in the past. In response to the request, the payment object service 1012 may access an object data repository to determine whether the scanned object is, in fact, unique. For instance, if the payment object service 1012 is unable to identify a matching object within the object data repository, then the payment object service 1012 may deem the object to be unique and add the images of the scanned unique object 1006 to the object data repository. However, if there is a matching object specified within the object data repository, the payment object service 1012 may reject the giver's 1002 request and, in turn, request that the giver 1002 provide additional recipient information that may be associated with the object, rendering the association unique.

The payment object service 1012 may notify the giver 1002 that the unique object 1006 may now be utilized as a payment object once the payment object service 1012 has added the relevant information regarding the unique object 1006 within the object data repository. This may enable the giver 1002 to provide the unique object 1006 to the recipient, who in turn may utilize his/her mobile device 1010 to scan the unique object 1006 and redeem the associated payment value. For instance, the giver 1002 may provide the recipient with detailed instructions for downloading an application to his/her mobile device 1010, which may be used to access the payment object service 1012. The recipient may utilize this application to upload images of the unique object 1006 from his/her mobile device 1010 to the payment object service 1012. In an embodiment, similar to the one-way function described above in connection with FIGS. 1 and 9, the object and payment information stored within the object data repository may be transformed using a one-way function or otherwise based, at least in part, on a one-way function, such as a cryptographic hash function, message authentication code algorithm, or a key derivation function. In this manner, an entity with output of the function but without access to the corresponding input, is unable to determine the input without, for instance, extraordinary expenditure of computational resources necessary for a cryptographic (e.g., brute force) attack. The output of the one-way function may be associated with the payment amount.

Upon receiving the images from the recipient's mobile device 1010, the payment object service 1012 may utilize one or more heuristics to identify the unique features 1008 of the unique object 1006. Subsequently, the payment object service 1012 may access the object data repository to determine whether there is a matching entry corresponding to these unique features 1008. If there is, the payment object service 1012 may determine the associated payment value attached to the unique object 1006 and enable the recipient to redeem this payment value. Once the recipient has utilized any or the entire payment value associated with the unique object 1006, the payment object service 1012 may update an entry associated with the unique object 1006 to specify the current associated payment value.

In some embodiments, the payment object service 1012 may itself associate a payment amount to a unique object 1006 without any input from a giver 1002. For instance, the payment object service 1012 may operate and manage a marketplace, wherein the unique object 1006 is included within this marketplace as available inventory from the payment object service 1012. In such embodiments, the payment object service 1012 may determine the payment amount that is to be associated with the unique object 1006 based at least in part on the one or more images of the object 1006, which may be taken by the payment object service 1012 itself.

Figure 11:
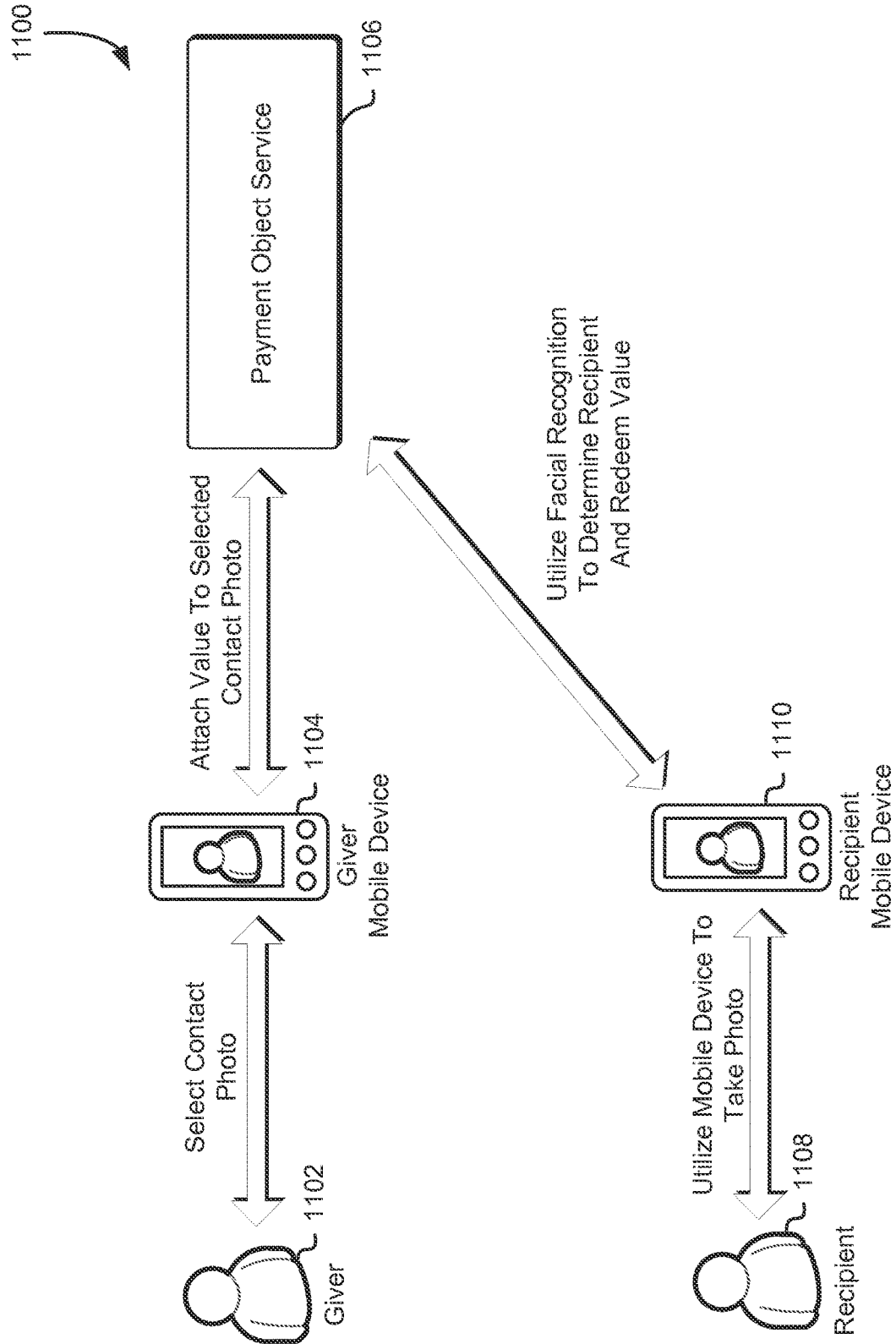
FIG. 11 shows an illustrative example of an environment in which a giver provides a payment object service with contact information that is to be used to associate a payment value to a particular contact in accordance with at least one embodiment.

As noted above, a giver may select one or more attributes of a contact from a set of one or more contacts that may be used as a payment object. For instance, a giver may select a contact from the set of one or more contacts and provide a photograph of the selected contact to a payment object service to associate a payment value to the physical representation of the contact. Thus, a recipient may utilize a mobile device to capture an image of himself/herself and utilize this image to redeem a payment value from the payment object service. Accordingly, FIG. 11 shows an illustrative example of an environment 1100 in which a giver 1102 provides a payment object service 1106 with contact information that is to be used to associate a payment value to a particular contact (e.g., recipient) in accordance with at least one embodiment.

In the environment 1100, a giver 1102 utilizes his/her mobile device 1104 or any other computer system to select a contact from a set of contacts for which a payment value is to be associated. Each contact entry within the mobile device 1104 may specify particular contact information that may be utilized to identify the contact from the set of contacts. For instance, contact information may include a photograph of the contact, name, address, telephone number, e-mail address and the like. In an embodiment, the giver 1102 selects a photographic image of the selected contact and uploads the image, through the mobile device 1104, to the payment object service 1106 to associate a payment value to the recipient. The payment object service 1106 may utilize one or more heuristics to decompose the received image into one or more data vectors, which may be utilized with facial recognition algorithms (e.g., Principal Component Analysis using eigenfaces, Linear Discriminate Analysis, Elastic Bunch Graph Matching using Fisherfaces, etc.), to identify the recipient. In some embodiments, the giver 1102 may utilize, through the mobile device 1104, one or more facial recognition algorithms to generate one or more representations of features of the recipient and transform these features for the payment object service 1106. The payment object service may associate additional details with this particular image, such as the giver's 1102 information, the payment value that is to be associated with the recipient and the recipient's contact information (e.g., name, address, etc.). In an alternative embodiment, the giver 1102 provides the contact information for the recipient 1108 as a form of recipient information that may be utilized to associate a payment value to a non-unique object.

When the payment object service 1106 successfully associates the payment value to the particular recipient 1108, the payment object service 1106 or the giver 1102 may notify the recipient 1108 that he/she may access the payment object service 1106 to redeem the associated payment value. For instance, a recipient 1108 may utilize his/her mobile device 1110 to capture a photographic image of himself/herself for verification. The recipient 1108 may upload, through the mobile device 1110, the photographic image to the payment object service 1106. Subsequently, the payment object service 1106 may utilize one or more facial recognition algorithms to decompose the image into one or more vectors that may be compared to other known vectors stored within the object data repository. If the payment object service 1106 is able to identify the recipient 1108, the payment object service 1106 may enable the recipient 1108 to redeem any associated payment value that may have been provided to him/her by one or more givers 1102. Once the recipient 1108 has redeemed any or the entire associated payment value, the payment object service 1106 may update the recipient's 1102 profile to specify the current remaining payment value.

Figure 12:
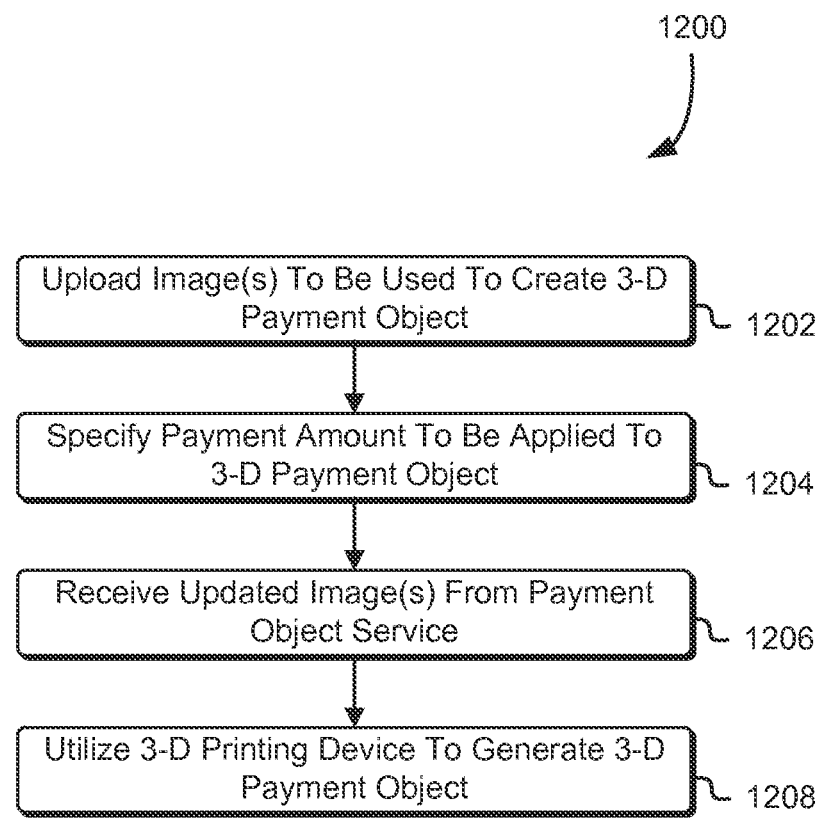
FIG. 12 shows an illustrative example of a process for uploading one or more images to a payment object service to generate a three-dimensional payment object in accordance with at least one embodiment.

As noted above, a customer of a payment object service may provide one or more images to the payment object service to request association of a payment amount to a 3-D payment object, which may be printed using the customer's own 3-D printing device. Accordingly, FIG. 12 shows an illustrative example of a process 1200 for uploading one or more images to a payment object service to generate a three-dimensional payment object in accordance with at least one embodiment. The process 1200 may be performed by a customer of a payment object service, which may utilize a mobile device or other computer system to capture or otherwise obtain one or more images of an object that may be utilized to create the 3-D payment object. The customer may also utilize this mobile device or computer system to access the payment object service in order to upload these images and enable a payment amount to be associated with the 3-D payment object.

In an embodiment, a customer selects an object that he/she desires to use as a basis for a 3-D payment object that is to be reproduced through use of a 3-D printing device. The customer may scan this object utilizing one or more cameras or other visual recording devices to capture one or more images of the selected object. These captured one or more images may illustrate the object in several different angles, such that these images may be usable to create the 3-D payment object. Once the customer has obtained these one or more images, he/she may access a payment object service to request creation of the 3-D payment object. In order for the payment object service to do this, the customer may upload 1202 the one or more images that are to be used to create the 3-D payment object to the payment object service and specify 1204 a payment amount that is to be applied to the 3-D payment object.

In response to the customer's request, the payment object service may determine whether the provided one or more images represent a unique object that may be used to generate the 3-D payment object. For instance, the payment object service may decompose the one or more images into one or more data vectors. Subsequently, the payment object service may access an object data repository to determine whether these one or more data vectors match any existing data vectors. If there is a match, then the desired object is not unique. This may cause the payment object service to inject one or more unique features into the provided one or more images to render the 3-D payment object to be created unique upon printing. For instance, the payment object service may add a bar code or QR code to the one or more images. Alternatively, or additionally, the payment object service may add one or more unique logos or images to the provided one or more images to add further uniqueness to the 3-D payment object to be created. Once the payment object service has rendered the one or more images to represent a new unique 3-D payment object, the payment object service may provide these updated one or more images to the customer. Thus, the customer may receive 1206 the updated one or more images from the payment object service. The updated one or more images may be provided to the customer in a format that can be used by a 3-D printing device to generate the 3-D payment object. For instance, the one or more images (e.g., 3-D model) may be provided to the customer in a computer-aided design (CAD) file format or other file format that a 3-D printing device may be configured to use.

Once the customer has received the one or more updated images from payment object service, the customer may utilize 1208 his/her 3-D printing device to generate the 3-D payment object. The 3-D payment object may include the object selected by the customer and the one or more unique features injected into the object by the payment object service. The customer may provide the 3-D payment object to a recipient to enable the recipient to redeem any associated payment amount. For instance, the customer may provide the recipient with instructions on how to access the payment object service and capturing one or more images for redemption of the associated payment amount.

Figure 13:
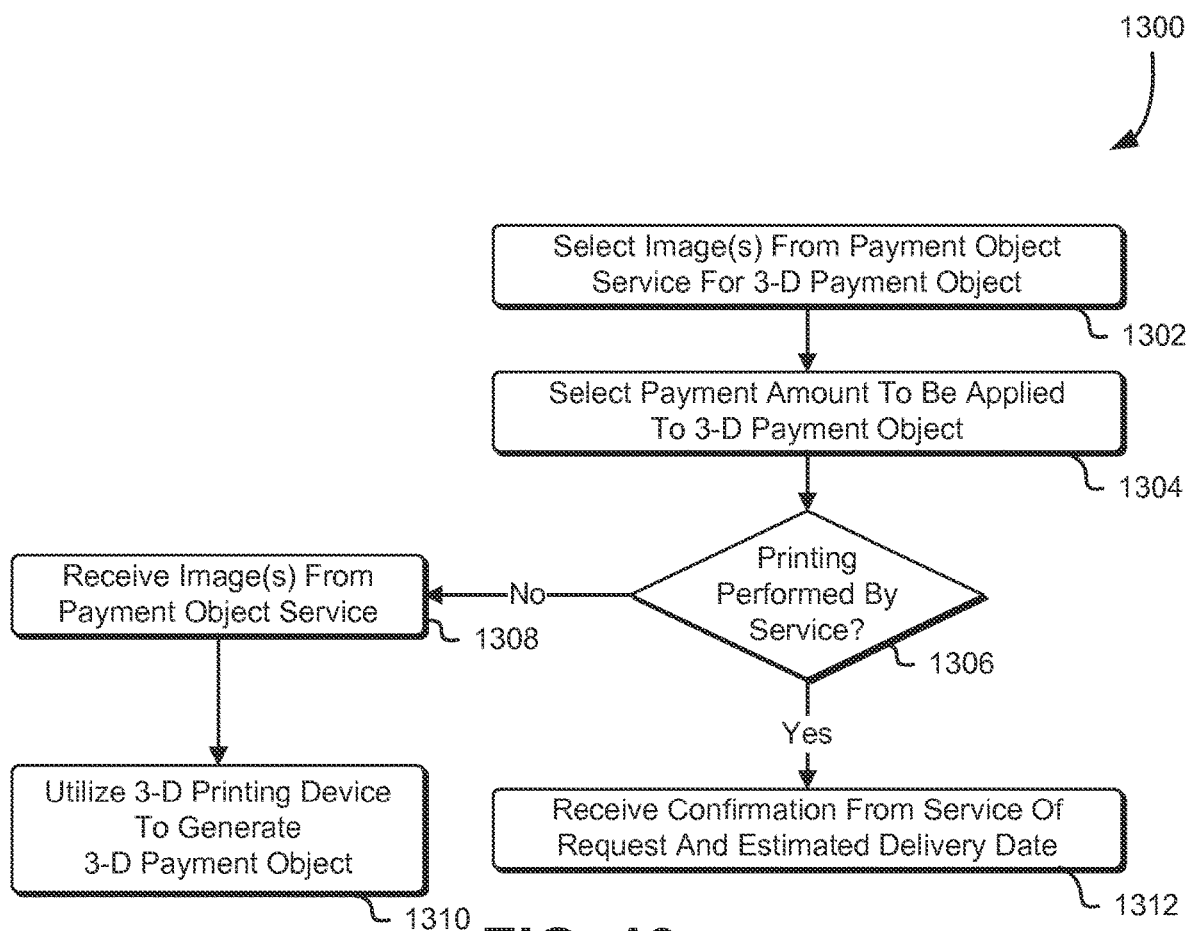
FIG. 13 shows an illustrative example of a process for utilizing a payment object service interface to select a design for a three-dimensional payment object and requesting creation of the three-dimensional payment object in accordance with at least one embodiment.

As noted above, a customer may select a default design from a payment object service that may be used to generate a 3-D payment object and associate a payment amount to this 3-D payment object. For instance, the payment object service may provide customers with an interface, such as the interface illustrated in FIG. 5, which may include one or more graphical representations of designs that may be used to generate the 3-D payment object. Accordingly, FIG. 13 shows an illustrative example of a process 1300 for utilizing a payment object service interface to select a design for a three-dimensional payment object and requesting creation of the three-dimensional payment object in accordance with at least one embodiment. The process 1300 may be performed by any customer of the payment object service that may want to generate a 3-D payment object that is to be provided to a recipient.

Instead of providing his/her own set of images for generating a 3-D payment object, a customer may select 1302 one or more default images from the payment object service that may be used to generate the desired 3-D payment object. These one or more default images may be presented to the customer through a payment object service interface, which the customer may access through a mobile device or any other computer system capable of accessing the payment object service through a communications network, such as the Internet. In addition to selecting the one or more default images that are to be used, the customer, through the interface, may select 1304 a payment amount that is to be applied to the 3-D payment object.

Through the interface, the payment object service may show the customer a graphical representation of the 3-D payment object that is to be created. For instance, when a customer selects the one or more default images for use in creating the 3-D payment object, the payment object service may inject one or more unique features to these selected images and generate a graphical representation of the 3-D payment object. Further, the payment object service may enable the customer to modify this graphical representation of the 3-D payment object to adjust any of the injected unique features (e.g., size, shape, color, etc.) to his/her liking. The payment object service may subsequently determine whether the 3-D payment object is sufficiently unique.

Once the images that are to be used to generate the 3-D payment object have been finalized, the customer may determine 1306 whether the printing of the 3-D payment object is to be performed by the payment object service through a 3-D printing service or by the customer himself/herself using a personal 3-D printing device. If the customer opts to print the 3-D payment object himself/herself, the payment object service may provide the generated one or more images of the 3-D payment object to the customer. These one or more images may be provided to the customer in a format that may be used deciphered by a 3-D printing device and used to generate the 3-D payment object. Thus, if the printing of the 3-D payment object is to be performed by the customer, the customer may receive 1308 the one or more images from the payment object service and utilize 1310 a 3-D printing device to generate the 3-D payment object.

However, if the customer determines that the printing is to be performed by the payment object service through a 3-D printing service, the payment object service may provide the one or more images to the 3-D printing service and request creation of the 3-D payment object. The payment object service may receive a confirmation from the 3-D printing service of the request and an estimated time for completion of the task. This may enable the payment object service to estimate a delivery date for the 3-D payment object, whether to the customer or to the recipient as specified by the customer. Thus, the customer may receive 1312 confirmation from the payment object service of the submitted request to generate the 3-D payment object and an estimated delivery date for the 3-D payment object.

Figure 14:
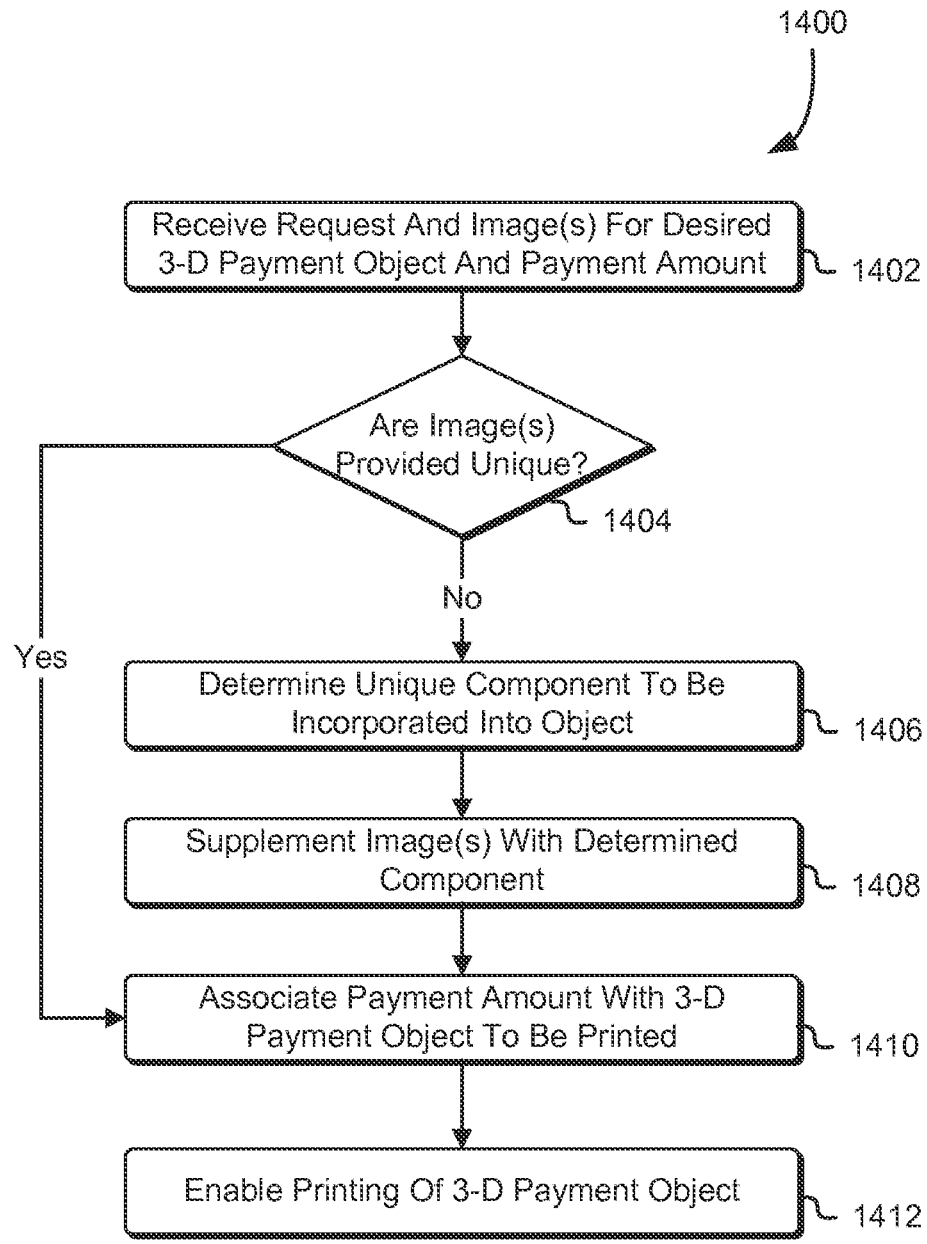
FIG. 14 shows an illustrative example of a process for utilizing one or more images to generate a three-dimensional payment object and associate a payment amount to the object in accordance with at least one embodiment.

As noted above, a payment object service may receive one or more requests from customers to generate one or more 3-D payment objects and associate a payment amount to each of these objects. Customers may provide one or more images of the 3-D payment object that is to be produced, whereby the payment object service may determine whether these images may be used to generate a unique 3-D payment object or if additional features must be included in order to render the resulting 3-D payment object to be unique. Accordingly, FIG. 14 shows an illustrative example of a process 1400 for utilizing one or more images to generate a three-dimensional payment object and associate a payment amount to the object in accordance with at least one embodiment. The process 1400 may be performed by the aforementioned payment object service, which may be configured to interact with customers of the payment object service through an interface. Further, the payment object service may be configured to manage payment amounts that are associated to existing 3-D payment objects.

The payment object service may receive 1402, from a customer of the payment object service, a request to create a 3-D payment object. The request may include one or more images of an object that is to be used to generate a replica of the object that may be used as a 3-D payment object. Further, the request may specify a payment amount that is to be applied to the 3-D payment object. The customer may provide the request to the payment object service through an interface made available by the payment object service. The interface may enable the customer to upload his/her own images of an object that is to be used to create the 3-D payment object. Alternatively, the customer may select, through the interface, one or more default designs which, along with one or more unique features, may be used to create the 3-D payment object.

Once the payment object service has obtained the one or more images from the customer, the payment object service may determine 1404 whether the provided one or more images represent a unique object that may be used to create the 3-D payment object. In an embodiment, the payment object service decomposes the one or more provided images into one or more data vectors based at least in part on the one or more identified contours of the desired object illustrated in the one or more images. The payment object service may compare these one or more vectors to other known vectors for other 3-D payment objects to determine whether the desired 3-D payment object to be created is unique. While image decomposition is used throughout the present disclosure for the purpose of illustration, other methods may be used to determine whether the one or more provided images represent a unique object. For instance, in some embodiments, the payment object service may utilize image recognition techniques to compare the received one or more images to images of known 3-D payment objects to determine whether the received one or more images represent a unique object that may be used as a model for the 3-D payment object to be created.

If the one or more provided images are deemed to not be unique, the payment object service may determine 1406 what one or more unique components may be incorporated into the 3-D payment object to be created. Once the payment object service has determined which one or more unique components are to be incorporated into the 3-D payment object, the payment object service may supplement 1408 the one or more provided images with the one or more determined components. For instance, a payment object service may determine that a unique bar code or QR code may be sufficient to provide a unique component to the 3-D payment object to be created. Alternatively, or additionally, the payment object service may inject one or more unique images or colors into the one or more images that may provide the 3-D payment object to be created with sufficient uniqueness.

Once the one or more provided images have been supplemented with the determined one or more components necessary to render the object to be created unique or the payment object service has determined that images, as provided, already represent a unique object, the payment object service may associate a payment amount with the 3-D payment object to be printed. For instance, in an embodiment, the payment object service adds the one or more images to an object data repository, which may also include the one or more vectors obtained from decomposing the one or more images for analysis. Additionally, the payment object service may access a customer account information data store to generate or modify a recipient account to specify that the 3-D payment object is associated with the recipient and the payment amount that is associated with this 3-D payment object.

The payment object service may subsequently enable 1412 printing of the 3-D payment object. For instance, if the customer has specified that the 3-D payment object is to be printed utilized his/her own 3-D printing device, the payment object service may provide the customer with the one or more images in a particular format that may be utilized by the 3-D printing device to create the 3-D payment object. Alternatively, if the customer has specified that the payment object service is to create the 3-D payment object, the payment object service may submit a request to a 3-D printing service to create the 3-D payment object. The payment object service may provide the 3-D printing service with the one or more images of the 3-D payment object to be created. In response to the request, the 3-D printing service may provide the payment object service with a confirmation of the request and an estimated completion time for the object. The payment object service may also be able to periodically check the status of the 3-D payment object through additional communications with the 3-D printing service. The payment object service, in such instances, may provide the customer with a confirmation of the request and provide an estimated date of delivery for the 3-D payment object.

Figure 15:
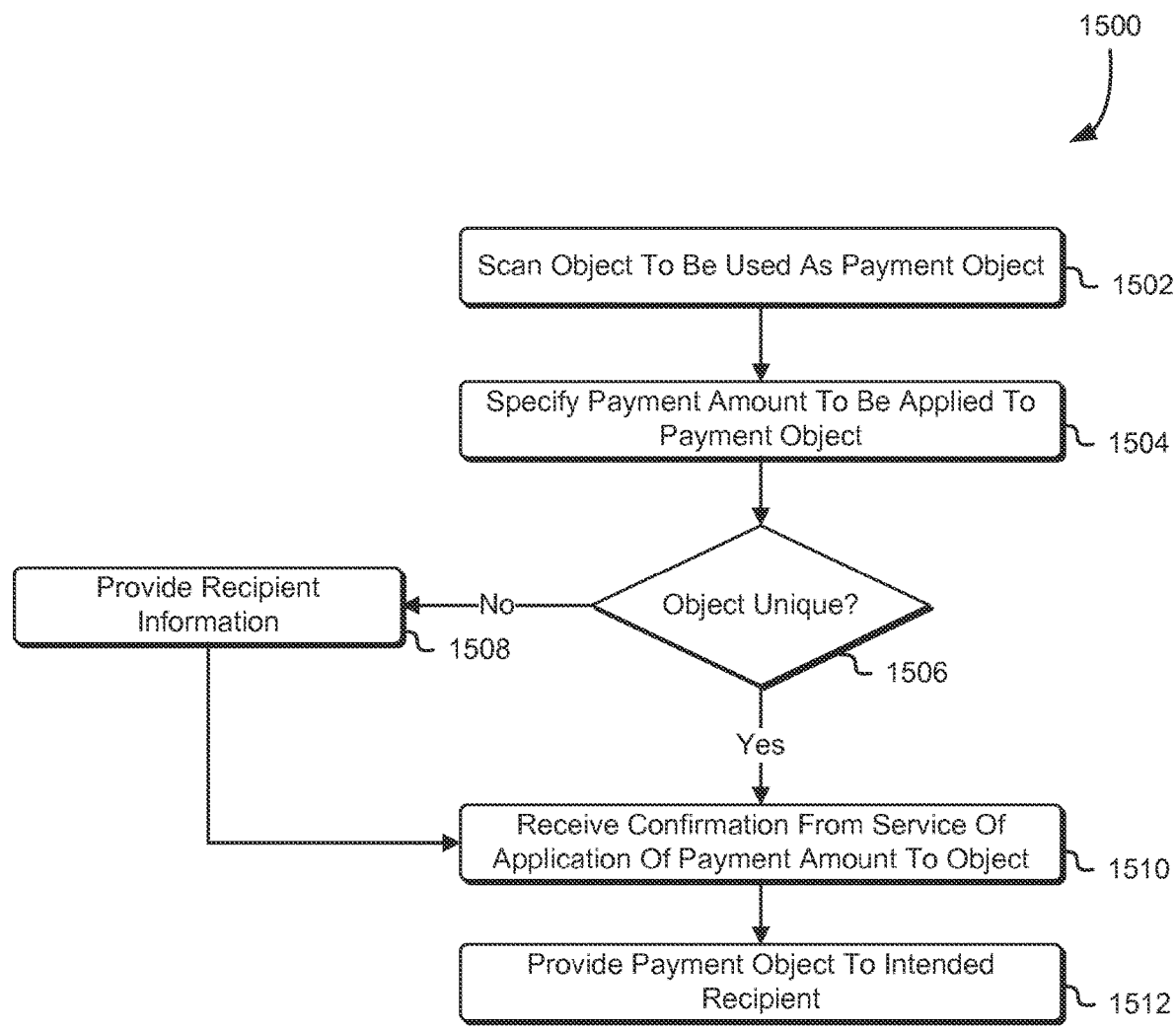
FIG. 15 shows an illustrative example of a process for requesting association of a payment value to an object based at least in part on whether the object is unique in accordance with at least one embodiment.

As noted above, a giver may access a payment object service to request that a payment amount be associated with an object of the giver's choosing. This object may be mass-produced and easily obtainable through a retail store or other merchant. Alternatively, the object may be unique, such as a handwritten note or other personal creation. Accordingly, FIG. 15 shows an illustrative example of a process 1500 for requesting association of a payment value to an object based at least in part on whether the object is unique in accordance with at least one embodiment. The process 1500 may be performed by a giver, who may want to provide an object to a recipient and enable the recipient to obtain an additional payment amount associated with the object. The giver may have access to a payment object service through one or more computing devices, such as a mobile device or other computing system.

In order to utilize a payment object service to associate a payment amount with an object, a giver may be required to scan 1502 the object that is to be used as a payment object. For instance, the giver may utilize an interface provided by the payment object service to access the service and upload one or more images of the object to be used as the payment object. For example, the interface may include an option for the giver to utilize a camera or other peripheral device to capture one or more images of the object that is to be used as the payment object. This may cause the camera or other peripheral device to activate and enable the giver to capture different images of the object at different angles. This may enable the payment object service to determine the various contours and dimensions of the object that is to be used for future verification. Once the giver has scanned the object that is to be used as a payment object, the giver, through the interface, may specify 1504 the payment amount that is to be applied to the payment object.

The payment object service may be configured to evaluate the one or more images of the scanned object to determine whether the object is unique. For instance, the payment object service may decompose the received one or more images of the scanned object into one or more data vectors. The payment object service may compare these one or more data vectors to data vectors of known payment objects and other objects to determine if there is a match. A discovered match may indicate that the scanned object is not unique. This may cause the payment object service to notify the giver that the scanned object is not unique and request additional recipient information that may be associated with the object, such that the association between this information and the object is unique. Thus, the customer may determine 1506 whether the scanned object is unique by either obtaining a notification from the payment object service that the object is not unique or receiving no requests for additional information.

If the giver determines, through notification from the payment object service, that the scanned object is not unique, the giver may provide 1508 the payment object service with recipient information that may be associated with the scanned object. The recipient information may include contact information for the recipient, such as name, address, telephone number, e-mail addresses and the like. Additionally, or alternatively, the recipient information may include a photographic image of the recipient, which may be used to identify the recipient attempting to redeem the payment amount associated with the non-unique object.

Once the giver has provided the requisite recipient information or the payment object service has deemed the object to be unique, the giver may receive 1510 confirmation from the payment object service of the application of the requested payment amount to the object. This may enable the giver 1512 to provide the scanned object to the intended recipient. Further, the giver may provide the recipient with instructions for accessing the payment object service and utilizing the object to redeem the associated payment amount. For instance, a giver may instruct the recipient to download an application to his/her mobile device, which may be used to interact with the payment object service. The recipient may utilize this application to scan the object and redeem the associated payment amount.

Figure 16:
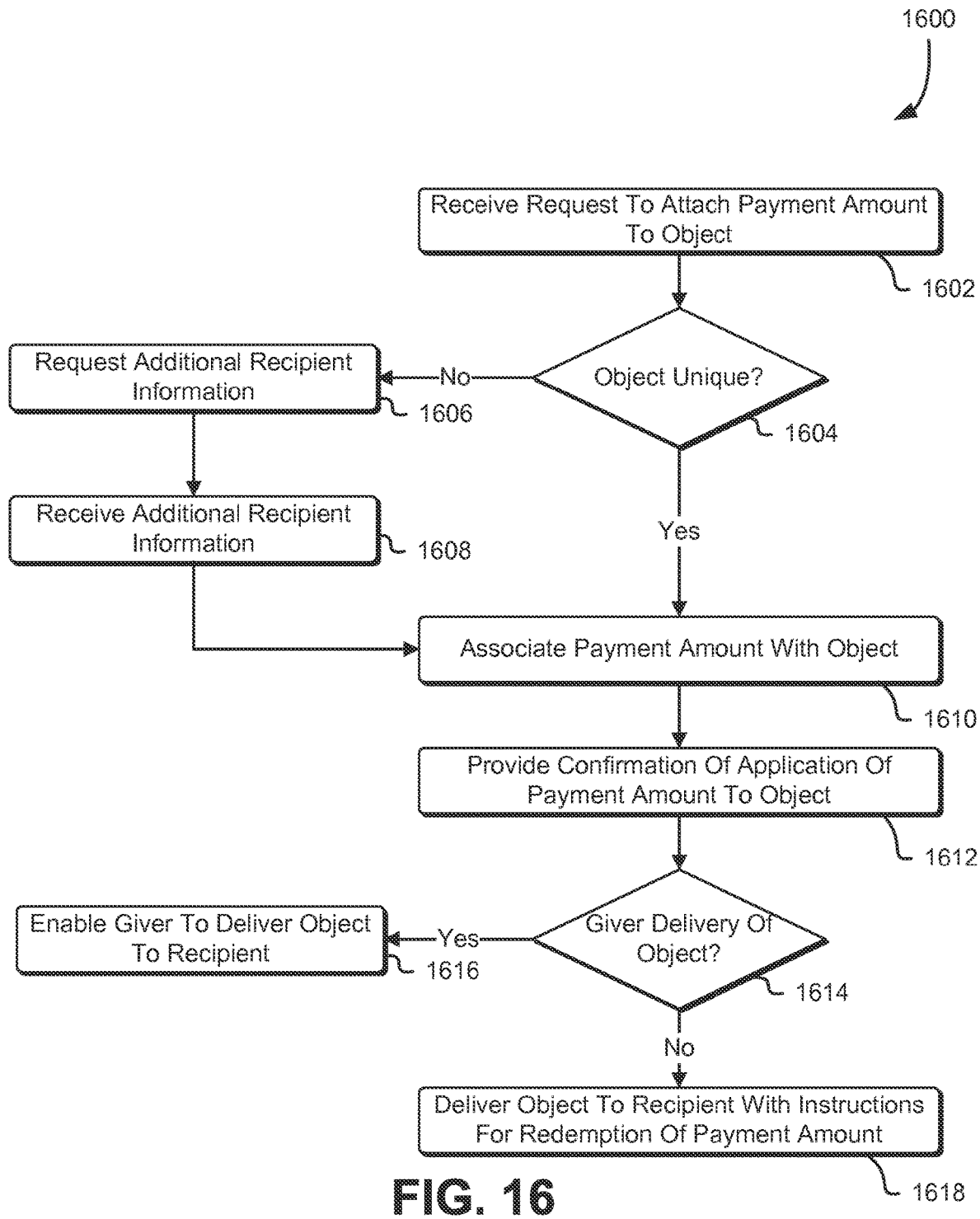
FIG. 16 shows an illustrative example of a process for associating a payment amount to an object in response to a giver request in accordance with at least one embodiment.
Figure 17:
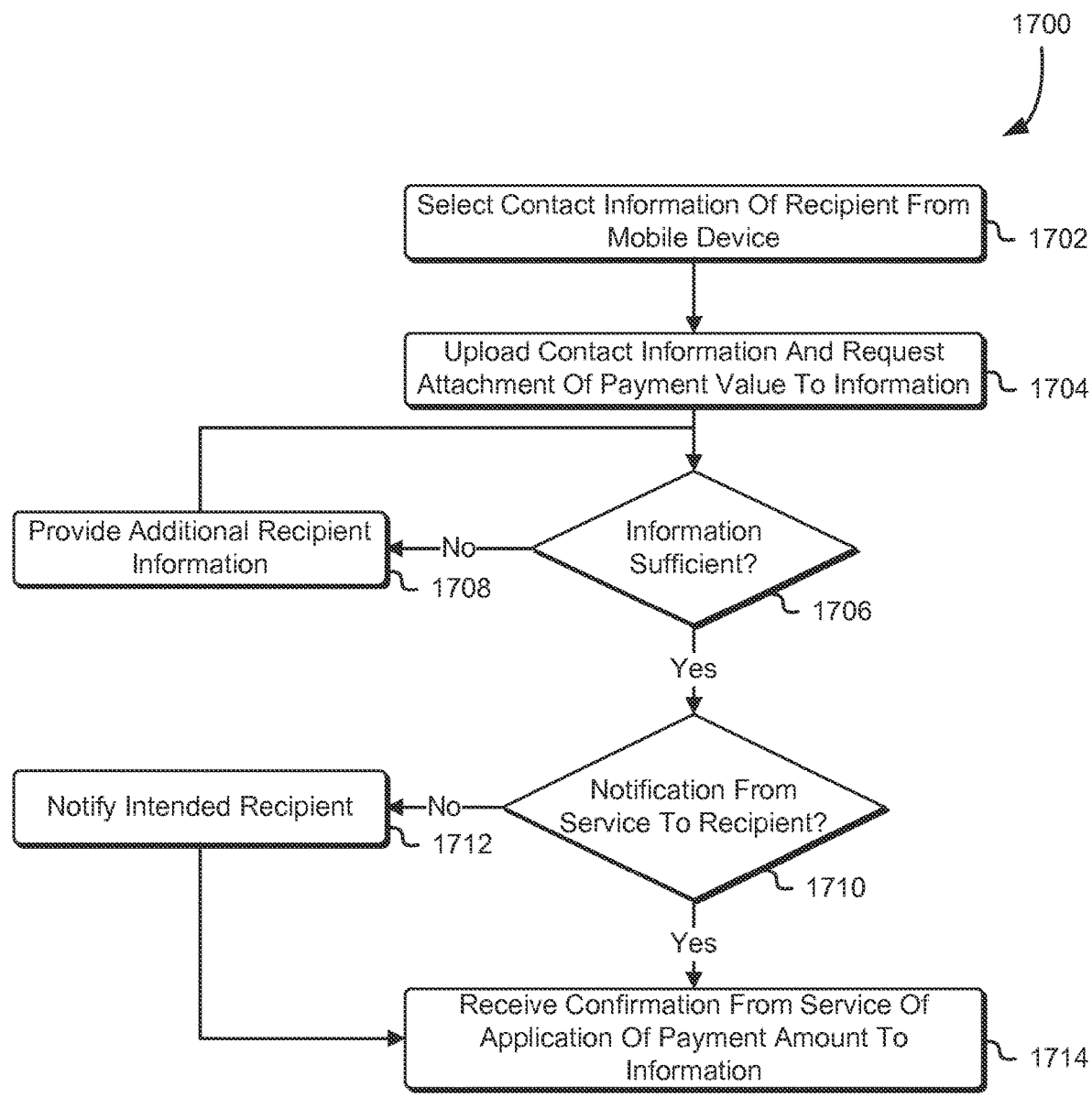
FIG. 17 shows an illustrative example of a process for requesting association of a payment value to contact information of a recipient in accordance with at least one embodiment.

As noted above, a giver may access a payment object service to request association of a payment amount to an object. The object may either be unique or non-unique (e.g., mass-produced and/or readily available). The payment object service may utilize one or more images of the object to associate the specified payment amount to the object and enable delivery of the object to a recipient, who may be able to access the payment object service to redeem the associated payment amount associated with the object. Accordingly, FIG. 16 shows an illustrative example of a process 1600 for associating a payment amount to an object in response to a giver request in accordance with at least one embodiment. The process 1600 may be performed by the aforementioned payment object service, which may be configured to receive requests from one or more givers through an interface or other application installed on a giver computer system. Further, the payment object service may be configured to deliver the object to a recipient upon request by the giver. The payment object service may also interact with or provide a marketplace, wherein givers may select one or more objects that may be used as payment objects and delivered to the recipient upon request.

A giver may utilize an interface to access the payment object service and provide one or more images of an object that is to be used as a payment object. For instance, the giver may utilize a camera from a mobile device or other computer system to capture one or more images of an object. Additionally, the giver may specify, through the interface, a payment amount that is to be associated to the object. In an alternative embodiment, the interface specifies one or more objects that may be purchased by the giver and utilized as a payment object. This object, as will be described below, may be delivered from the payment object service to the recipient or the giver based at least in part on the giver's request. Thus, the payment object service may receive 1602 a request from a giver to attach a payment amount to a selected object.

Once the payment object service has received the request and the one or more images of the object that is to be used as a payment object, the payment object service may determine 1604 whether the object is unique. For instance, as described above, the payment object service may decompose the one or more received images of the object into one or more data vectors. These data vectors may be compared to data vectors of known payment objects and other objects to determine whether there is a match. If there is a match, the payment object service may determine that the object selected by the giver is not unique. In an alternative embodiment, if the giver selects an object provided by the payment object service, the payment object service may deem this object to not be unique as well.

If the selected object is not unique, the payment object service may request 1606, through the interface, additional recipient information that may be used to associate the object with the recipient. This association may provide sufficient uniqueness to enable use of the non-unique object as a payment object. In response to the request, the payment object service may receive 1608 this additional recipient information from the giver. The additional recipient information may include contact information for the recipient, such as the name of the recipient, address, telephone numbers, e-mail addresses and the like. Further, this additional recipient information may include one or more photographic images of the recipient, which may be used by the payment object service to identify the recipient when he/she uses the payment object to redeem the associated payment amount. If the information provided is not sufficient, the payment object service may either request additional information or deny the giver's request.

Once the payment object service has received the additional recipient information from the giver or has deemed the object to be unique, the payment object service may associate 1610 the specified payment amount with the object. If the specified object is unique, the payment object service may add the one or more provided images of the object to the object data repository and associate the payment amount to the entry created within the object data repository for the object. Alternatively, if the specified object is not unique, the payment object service may generate or modify a recipient account within the customer account information data store to specify the associated payment object described within the object data repository and the payment amount that is associated within the payment object. The payment object service may provide 1612 the giver with confirmation that the specified payment amount has been applied to the particular object once the above associations have been made.

Based at least in part on the information specified within the giver's request, the payment object service may determine 1614 whether the giver will be delivering the payment object to the intended recipient. For instance, if the giver has specified within the request that an existing object under his/her control is to be used as a payment object, the giver may opt to personally deliver the payment object to the intended recipient. In such circumstances, the payment object service may enable 1616 the giver to deliver the object to the intended recipient. Further, the giver may be able to provide the intended recipient with additional instructions that may be used to redeem the associated payment amount. Alternatively, if the giver has selected an object through the interface that is made available to customers by the payment object service, the payment object service may deliver 1618 the object to the recipient with instructions for redemption of the associated payment amount. In some embodiments, the payment object service may deliver the object to the giver, who in turn may give the object to the recipient directly.

In some embodiments, a giver may provide a payment object service with contact information that may itself be utilized as a payment object. For instance, a giver may provide a photographic image of a particular contact and have a payment amount associated with the contact. This may enable the payment object service to utilize one or more facial recognition techniques to verify the identity of the recipient and enable the recipient to redeem any payment amount that may be associated with him/her. Accordingly, shows an illustrative example of a process 1700 for requesting association of a payment value to contact information of a recipient in accordance with at least one embodiment. The process 1700 may be performed by a giver, who may utilize a mobile device or other computing device to communicate with a payment object service to request association of a payment amount with a recipient.

At any point, a giver may access the payment object service through an application installed on his/her mobile device or other computing system. Through this application, a giver may provide contact information for an intended recipient that may be used to associate a desired payment amount with the recipient. For instance, the giver may select 1702 contact information of the recipient from his/her mobile device. This may enable the giver to upload 1704 the contact information to the payment object service and request attachment of a payment value to this information. The contact information may include one or more unique features of the recipient. These unique features may be provided to the payment object service in the form of a photographic image of the recipient, a recording of the recipient or any other recipient imprint that may be unique to the recipient.

Once the giver has uploaded the contact information and has requested attachment of the payment value to the information, the payment object service may determine whether the information provided is sufficient to distinguish the recipient from other recipients or is capable of being utilized for the attachment. For instance, if the payment object service is unable to identify one or more unique features of the recipient from the received contact information, the payment object service may notify the giver that additional information is required. Thus, based at least in part on this notification (or lack thereof) from the payment object service, the giver may determine 1706 whether the provided contact information is sufficient. If it is not sufficient, the giver may provide 1708 additional recipient information to the payment object service for analysis.

If the contact information provided to the payment object service is sufficient, the payment object service may associate the payment amount with the particular contact information provided. For instance, if a photographic image of the recipient was provided to the payment object service, the payment object service may extract, through one or more facial recognition techniques, unique features of the recipient. The payment object service may then associate the payment value with these unique features. If the giver has specified that he/she will notify the intended recipient of the available payment value, the giver 1712 may proceed to notify the intended recipient of the payment amount associated within his/her information and provide instructions to enable the recipient to redeem the payment amount. For instance, a recipient may be required to capture a photographic image of himself/herself and upload this image to the payment object service to redeem the payment amount. This may cause the payment object service to utilize one or more facial recognition techniques to identify the recipient from the image. Once the giver has notified the intended recipient of the payment value associated with him/her or the recipient has been notified by the payment object service, the giver may receive 1714 confirmation from the payment object service of the application of the requested payment amount to the contact information. At this point, a recipient may be able to access the payment object service to redeem the associated payment amount.

Figure 18:
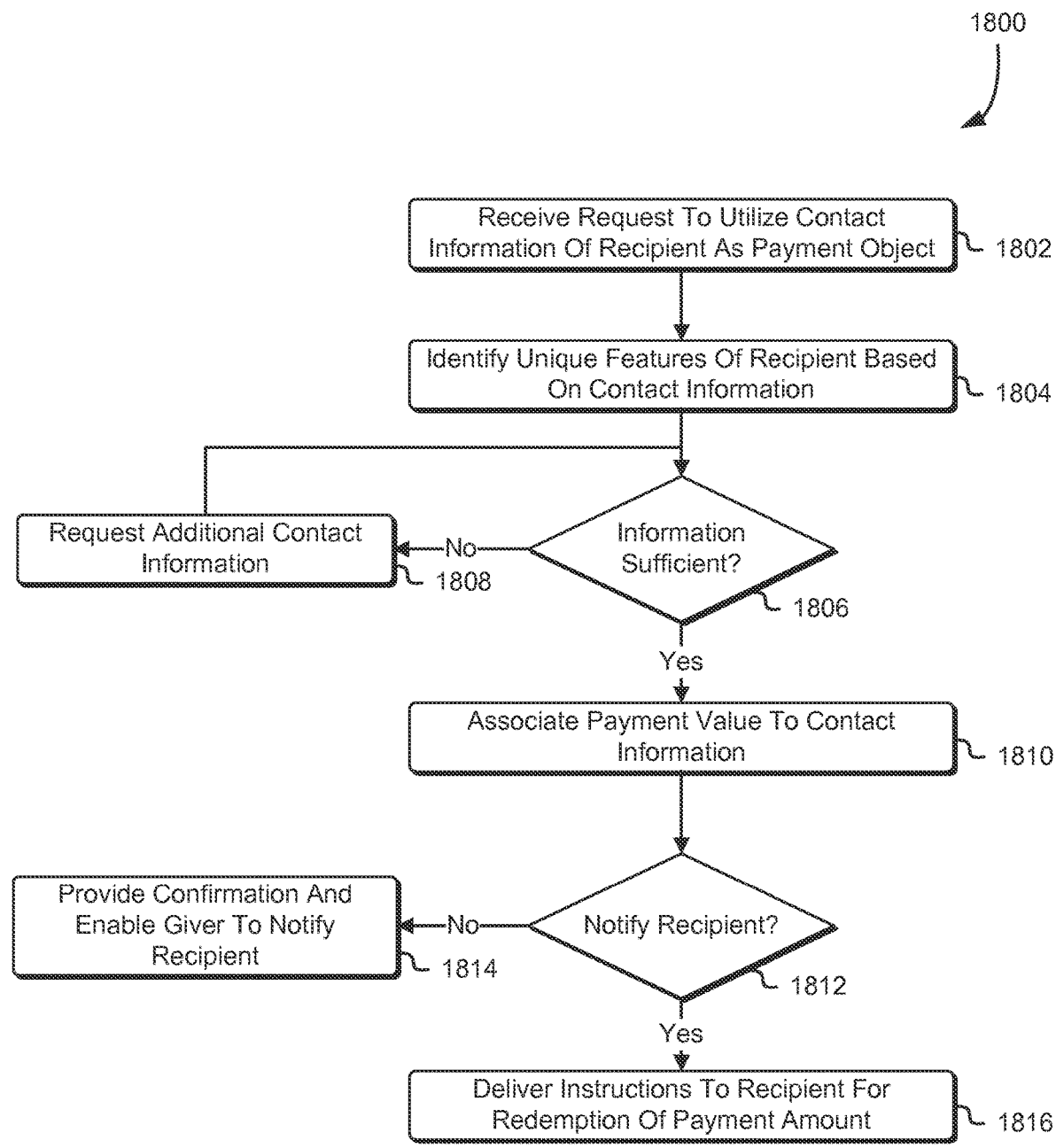
FIG. 18 shows an illustrative example of a process for associating a payment amount to contact information of a recipient received from a giver in accordance with at least one embodiment.

As noted above, a giver may specify particular contact information that may be utilized to associate a payment amount to a particular recipient. For instance, the giver may provide the payment object service with a photographic image of the recipient, which may be used by the payment object service to identify one or more unique features of the recipient. These unique features may be used to associate the requested payment amount with the recipient. Accordingly, FIG. 18 shows an illustrative example of a process 1800 for associating a payment amount to contact information of a recipient received from a giver in accordance with at least one embodiment. The process 1800 may be performed by the aforementioned payment object service, which may be configured to communicate with one or more givers to associate payment amounts with particular objects, including recipients themselves. The payment object service may also be configured to communicate with one or more recipients to notify these one or more recipients of the associated payment value in the event that the giver has instructed the payment object service to do so.

A giver may utilize an application or other interface installed on his/her mobile device or other computing device to access a payment object service and request to utilize contact information of a particular recipient as a payment object. For instance, a giver may select a photographic image of the intended recipient from a set of contacts and provide this image to the payment object service, along with a payment amount that is to be associated with the recipient. Thus, the payment object service may receive 1802 a request to utilize contact information for a particular recipient as a payment object. The request may further include the payment amount that is to be associated with the recipient, as well as other recipient information that may be useful in associating the recipient with the associated payment amount.

Once the payment object service has received the request from the giver to utilize particular contact information of a recipient as a payment object, the payment object service may analyze the received contact information to identify 1804 any unique features of the recipient that can be used to utilize the recipient as a payment object. For instance, using the example above, a payment object service may utilize one or more facial recognition techniques to determine whether a photographic image of the recipient, provided by the giver, to determine whether the recipient is associated with other payment amounts from other givers. If so, then the recipient may not be unique. Alternatively, if the payment object service is unable to identify an existing recipient that corresponds to the contact information provided by the giver, the payment object service may deem the recipient to be unique. Thus, based at least in part on these identified unique features of the recipient, the payment object service may determine 1806 whether the information provided by the giver is sufficient to associate a payment amount to the recipient.

If the information provided by the giver is insufficient, the payment object service may transmit, through the interface, a request 1808 for additional contact information that may be used to distinguish the specified recipient from other recipients. In response to the request, the giver may either provide the requested additional information or abandon his/her request to associate a payment amount to the specified recipient. The payment object service may utilize this additional information to further determine 1806 whether this information is now sufficient to distinguish the recipient from other recipients. If the information is sufficient, the payment object service may associate 1810 the payment amount to the received contact information. For instance, if the received contact information includes a photographic image of the recipient, any of the unique features garnered from the image may be stored within the object data repository for reference. Further, the payment object service may create a recipient account within the customer account information data store, which may be used to specify the associated payment amount and the corresponding information stored within the object data repository.

Once the payment amount has been associated with the contact information provided by the giver, the payment object service may determine 1812 whether to notify the recipient on the giver's behalf. For instance, if a giver has specified that he/she will notify the recipient directly upon confirmation that the payment value has been associated with the recipient, the payment object service may provide 1814 confirmation to the giver and enable the giver to notify the recipient. Additionally, the payment object service may provide the giver with instructions that the giver may provide to the recipient to enable the recipient to access the payment object service and redeem the associated payment value. Alternatively, if the giver has specified that the payment object service is to notify the recipient, the payment object service may deliver 1816 instructions to the recipient for redemption of the associated payment amount. This may enable the recipient to, in turn, access the payment object service and provide information necessary to determine the identity of the recipient.

Figure 19:
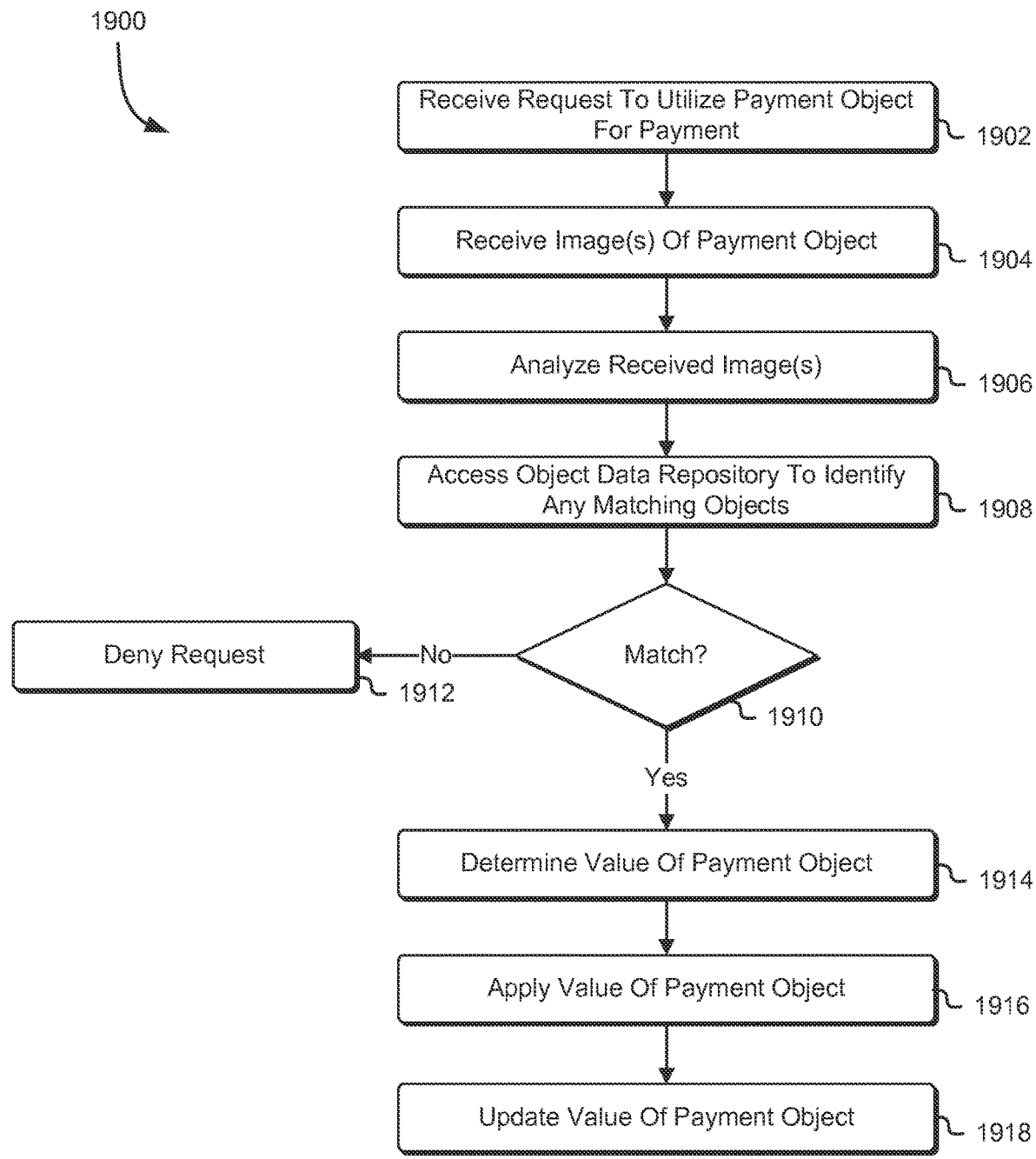
FIG. 19 shows an illustrative example of a process for verifying a three-dimensional payment object and enabling use of the payment object for payment in accordance with at least one embodiment.

As noted above, a recipient of a payment object may access the payment object service to redeem a payment amount that is associated with the payment object. In order to do so, a recipient may be required to scan the payment object and provide additional information that may be usable to verify that the object is indeed a payment object and that the recipient is authorized to redeem the associated payment amount. Accordingly, FIG. 19 shows an illustrative example of a process 1900 for verifying a three-dimensional payment object and enabling use of the payment object for payment in accordance with at least one embodiment. The process 1900 may be performed by the aforementioned payment object service, which may be configured to receive information from one or more recipients of a payment object and utilize this information to determine whether the payment object is associated with a payment amount that may be redeemed by the one or more recipients.

When a recipient receives a payment object from a giver or the payment object service, the recipient may access the payment object service, through an interface (e.g., application) installed on his/her mobile device or other computer system to request redemption of a payment amount that may be associated with the received payment object. Thus, the payment object service may receive 1902 a request to utilize the payment object for the payment of goods/service or to redeem the associated payment amount for other purposes (e.g., adding the associated funds to the recipient's account, etc.). As part of the request, a recipient may be required to scan the payment object from different angles such that the captured images of the payment object may be analyzed to determine whether the payment object is authentic. These images may be provided to the payment object service, which may receive 1904 these one or more images and perform 1906 the aforementioned analysis of these images to determine whether the scanned object is, in fact, a payment object with an associated payment amount.

In order to analyze the received one or more images, the payment object service may decompose the various images into one or more data vectors, which may comprise the spatial coordinates of the various features of the object as well as any distinguishing characteristics of the object that may be used to distinguish this object from other known payment objects. Once the payment object service has decomposed these various images into the one or more data vectors, the payment object service may access 1908 an object data repository to identify any known payment objects that may correspond to these one or more images. For instance, the object data repository may include an entry for each known payment object that has been recorded by the payment object service. Each entry may include data specifying one or more data vectors that may describe the associated payment object and its unique features. This may enable the payment object service to utilize the obtained data vectors for the recipient's object to determine 1910 whether there is a match between the recipient's object and any known payment objects specified within the object data repository.

If the payment object service is unable to identify a matching payment object for the recipient's object, the payment object service may deem the recipient's object to not be a payment object. In such an instance, the payment object service may deny 1912 the recipient's request to redeem a payment amount that may be associated with his/her object, as there may be no payment amount associated with the object. However, if the payment object service is able to identify a matching payment object within the object data repository, the payment object service may determine 1914 the associated payment amount of the payment object specified by the recipient. For instance, if the payment object specified by the recipient is unique, such as a handwritten note from the giver or the recipient himself/herself (e.g., photographic image of the recipient), the payment object service may identify an associated object entry within the object data repository and obtain, from the entry, the payment amount associated with the object. Alternatively, if the object is not unique (e.g., a mass-produced object), the payment object service may access a customer account information data store to identify a recipient account. The recipient account may specify the identity of the recipient (e.g., name, address, etc.), corresponding object entries within the object data repository and the payment amount associated with each object entry within the object data repository. This may enable the payment object service to properly identify the payment amount for the scanned payment object.

Once the payment object service has determined the value of the payment object, the payment object service may apply 1916 the value of the payment object to a purpose as specified by the recipient. For instance, through the interface, a recipient may specify that he/she would like to apply any or the entire payment amount associated with the payment object towards another purchase. Alternatively, the recipient may specify that the associated payment amount should be applied to his/her account for later use. The payment object service, upon applying any or the entire value of the payment object towards a recipient's stated purpose, may update 1918 the value of the payment object. For instance, the payment object service may modify the payment amount entry within the recipient's account in the customer account information data store to specify the current remaining value of the payment object. If the payment object is unique to the recipient, the payment object may update the value of the payment object by modifying the object entry within the object data repository to specify the current value of the payment object.

Figure 20:
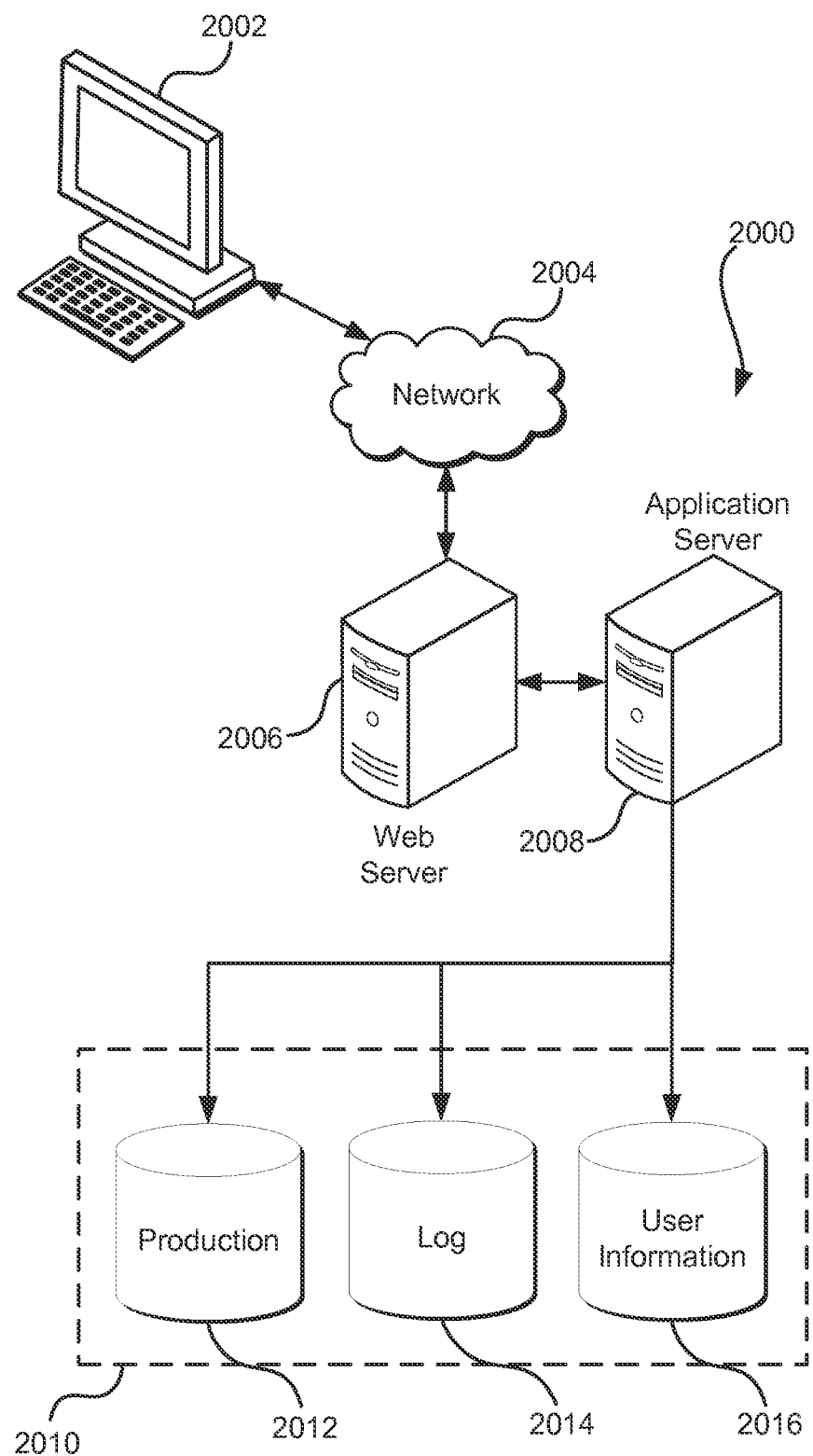
FIG. 20 shows an illustrative example of an environment in which various embodiments can be implemented.

FIG. 20 illustrates aspects of an example environment 2000 for implementing aspects in accordance with various embodiments. As will be appreciated, although a web-based environment is used for purposes of explanation, different environments may be used, as appropriate, to implement various embodiments. The environment includes an electronic client device 2002, which can include any appropriate device operable to send and/or receive requests, messages or information over an appropriate network 2004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 2006 for receiving requests and serving content in response thereto, although for other networks an alternative device serving a similar purpose could be used as would be apparent to one of ordinary skill in the art.

The illustrative environment includes at least one application server 2008 and a data store 2010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 2002 and the application server 2008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 2010 can include several separate data tables, databases, data documents, dynamic data storage schemes and/or other data storage mechanisms and media for storing data relating to a particular aspect of the present disclosure. For example, the data store illustrated may include mechanisms for storing production data 2012 and user information 2016, which can be used to serve content for the production side. The data store also is shown to include a mechanism for storing log data 2014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 2010. The data store 2010 is operable, through logic associated therewith, to receive instructions from the application server 2008 and obtain, update or otherwise process data in response thereto. The application server 2008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 2002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 20. Thus, the depiction of the system 2000 in FIG. 20 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Clause 1. A computer-implemented method for creating a three-dimensional payment object, comprising:
under the control of one or more computer systems configured with executable instructions,
receiving a request to associate a payment amount to the three-dimensional payment object, the request specifying a three-dimensional model of an object usable to print the three-dimensional payment object;
performing one or more operations to ensure the three-dimensional payment object, after printing, has one or more unique features;
updating at least one database to associate the payment amount with the three-dimensional payment object;
providing the three-dimensional model of the three-dimensional payment object for printing;
receiving a request to redeem at least a portion of the payment amount, the request specifying one or more images;
verifying, based at least in part on the one or more images and the one or more unique features, that the one or more images correspond to the three-dimensional payment object; and
updating the at least one database in accordance with redemption of the at least the portion of the payment amount.

Clause 2. The computer-implemented method of clause 1, wherein the one or more operations include modifying the three-dimensional model of the object to cause the three-dimensional payment object, after printing, to have the one or more unique features.

Clause 3. The computer-implemented method of clauses 1 or 2, wherein providing the three-dimensional model of the three-dimensional payment object for printing includes transmitting the three-dimensional model to a printing service configured to utilize the three-dimensional model to create the three-dimensional payment object and providing an estimated delivery time for the three-dimensional payment object.

Clause 4. The computer-implemented method of any of clauses 1 to 3, wherein providing the three-dimensional model of the three-dimensional payment object for printing includes transmitting the three-dimensional model to a customer computer system to enable a customer three-dimensional printing device to create the three-dimensional payment object.

Clause 5. A system, comprising at least one computing device configured to implement one or more services, wherein the one or more services are configured to:

receive a request to create a three-dimensional object and associate the three-dimensional payment object with first information;

determine second information that enables the three-dimensional object to be manufactured such that, after manufacturing, the three-dimensional object has one or more unique features;

associate the first information with the three-dimensional object to be created such that, when created, the created three-dimensional object is usable for at least one mode of authentication by use of the one or more unique features to demonstrate possession of the created three-dimensional object; and provide information usable to create the three-dimensional object.

Clause 6. The system of clause 5, wherein the one or more services are further configured to analyze a three-dimensional model of an object usable to manufacture the three-dimensional object to determine the second information that enables the three-dimensional object to be manufactured.

Clause 7. The system of clauses 5 or 6, wherein the one or more services are further configured to modify a three-dimensional model of an object to include the one or more unique features to determine the second information that enables the three-dimensional object to be manufactured.

Clause 8. The system of any of clauses 5 to 7, wherein the first information includes a payment amount.

Clause 9. The system of any of clauses 5 to 8, wherein a three-dimensional model of the three-dimensional object specifies a removable feature that, when removed, enables a set of images of the three-dimensional object without the removable feature to be used for the at least one mode of authentication.

Clause 10. The system of any of clauses 5 to 9, wherein the one or more services are further configured to:

receive a request to perform one or more operations, the request specifying one or more images;

verify, based at least in part on the one or more images and the one or more unique features, that the one or more images correspond to the three-dimensional object; and based at least in part on the at least one mode of authentication, enable performance of the one or more operations.

Clause 11. The system of any of clauses 5 to 10, wherein the one or more services are further configured to update a database to associate the one or more unique features with the three-dimensional object to be created, thereby causing the three-dimensional object to be created to be usable for the at least one mode of authentication.

Clause 12. The system of any of clauses 5 to 11, wherein enabling creation of the three-dimensional object includes transmitting a three-dimensional model of the three-dimensional object to a printing service configured to utilize the three-dimensional model to create the three-dimensional object.

Clause 13. A non-transitory computer-readable storage medium having stored thereon executable instructions that, when executed by one or more processors of a computer system, cause the computer system to at least:

receive a request to redeem at least a portion of a payment amount associated with a three-dimensional payment object, the three-dimensional payment object having one or more unique features and the request specifying one or more images of the three-dimensional payment object;

verify, based at least in part on the one or more images and the one or more unique features, that the one or more images correspond to the three-dimensional payment object; and update the payment amount associated with the three-dimensional payment object in accordance with redemption of the at least the portion of the payment amount.

Clause 14. The non-transitory computer-readable storage medium of clause 13, wherein the instructions further comprise instructions that, when executed by the one or more processors, cause the computer system to:

at least partially fulfill a request to create the three-dimensional payment object and associate the payment amount to the three-dimensional payment object, perform one or more operations to determine information that enables manufacture of the three-dimensional payment object in a manner that causes the three-dimensional payment object to have the one or more unique features;

associate the payment amount with the three-dimensional object; and provide a three-dimensional model of the three-dimensional payment object for manufacturing of the three-dimensional payment object.

Clause 15. The non-transitory computer-readable storage medium of clause 14, wherein the instructions that cause the computer system to provide the three-dimensional model of the three-dimensional payment object for manufacture, when executed by the one or more processors, causes the computer system to transmit the three-dimensional model to a printing service configured to utilize the three-dimensional model to create the three-dimensional payment object.

Clause 16. The non-transitory computer-readable storage medium of clause 14 or 15, wherein the instructions that cause the computer system to provide the three-dimensional model of the three-dimensional payment object for printing, when executed by the one or more processors, causes the computer system to transmit the three-dimensional model to a customer computer system to enable a customer three-dimensional printing device to create the three-dimensional payment object.

Clause 17. The non-transitory computer-readable storage medium of any of clauses 14 to 16, wherein the instructions further comprise instructions that, when executed by the one or more processors, cause the computer system to update a database to associate the one or more unique features with the three-dimensional payment object to be created to associate the payment amount with the three-dimensional payment object to be created.

Clause 18. The non-transitory computer-readable storage medium of any of clauses 14 to 17, wherein the one or more operations include modifying the three-dimensional model of the object to cause the three-dimensional payment object, after printing, to have the one or more unique features.

Clause 19. The non-transitory computer-readable storage medium of any of clauses 13 to 18, wherein the three-dimensional payment object includes a removable feature that, when removed, enables a set of images of the three-dimensional payment object without the removable feature to be used to redeem at least a portion of the payment amount.

Clause 20. The non-transitory computer-readable storage medium of any of clauses 13 to 19, wherein the one or more unique features include at least one feature that is at least three-dimensional.

Clause 21. A computer-implemented method for associating a payment amount to an object, comprising:
under the control of one or more computer systems configured with executable instructions,
receiving a request to associate a payment amount to an object, the object being one of multiple, three-dimensional copies of a same item, the request specifying recipient information and one or more images of the object;
performing one or more operations to ensure that an association between the recipient information and the object is unique in a database that associates instances of recipient information with corresponding objects;
associating the payment amount with the object and the recipient information in the database;
receiving a request to redeem at least a portion of the payment amount, the request specifying one or images and the recipient information;
verifying, based at least in part on the one or more images and the recipient information, that the one or more images and the recipient information correspond to the association between the recipient information and the object; and
updating the at least one database in accordance with redemption of the at least the portion of the payment amount.

Clause 22. The computer-implemented method of clause 21, further comprising providing the object to enable redemption of the at least the portion of the payment amount.

Clause 23. The computer-implemented method of clause 21 or 22, wherein the recipient information includes recipient biometric information, one or more recipient account identifiers, one or more recipient e-mail addresses, and one or more recipient usernames for one or more services.

Clause 24. The computer-implemented method of any of clauses 21 to 23, wherein the request is received through an interface, the interface specifying one or more objects from which the object is selected to generate the request.

Clause 25. A system, comprising at least one computing device configured to implement one or more services, wherein the one or more services are configured to:
receive a request to associate first information to an object, the request specifying second information to be associated with the object and one or more images of the object;
determine, based at least in part on the second information and the one or more images of the object, whether an association of the second information and the one or more images of the object is unique;
as a result of determining the association is unique, associate the first information to the object such that the object and the second information are usable for at least one mode of authentication by use of the unique association between the object and the second information to demonstrate possession of the object and the second information; and
enable the object and the second information to be used for the at least one mode of authentication.

Clause 26. The system of clause 25, wherein the one or more services are further configured to:
receive a request to perform one or more operations, the request specifying one or more images and the second information;
verify, based at least in part on the one or more images and the second information, that the one or more images and the second information correspond to the association between the second information and the object; and
based at least in part on the at least one mode of authentication, enable performance of the one or more operations.

Clause 27. The system of clause 25 or 26, wherein the object is one of multiple, three-dimensional copies of a same item.

Clause 28. The system of any of clauses 25 to 27, wherein:
the second information includes one or more representations of features of a recipient; and
the one or more services are further configured to utilize the one or more representations of features of the recipient to associate the object with the recipient.

Clause 29. The system of clause 28, wherein the one or more services are further configured to utilize one or more facial recognition algorithms to verify, based at least in part on the one or more representations of features of the recipient, that the recipient is authorized to perform one or more operations.

Clause 30. The system of any of clauses 25 to 29, wherein the one or more services are further configured to update at least one database to associate the first information to the object and the second information as a result of determining the association of the second information and the one or more images of the object is unique.

Clause 31. The system of any of clauses 25 to 30, wherein the associated first information is determined based at least in part on the one or more images of the object.

Clause 32. The system of any of clauses 25 to 31, wherein the one or more services are further configured to:
transform, using a one-way function, information specifying an association between a payment amount and the object; and
store the transformed information in a database usable to enable the object and other information to be used to redeem the associated payment amount.

Clause 33. A non-transitory computer-readable storage medium having stored thereon executable instructions that, when executed by one or more processors of a computer system, cause the computer system to at least:
receive a request to redeem at least a portion of a payment amount associated with an object, the request specifying one or more images and other information associated with the object;

verify, based at least in part on the one or more images and the other information, that the one or more images and the other information correspond to an association between the other information and the object; and update the payment amount associated with the object in accordance with redemption of the at least the portion of the payment amount.

Clause 34. The non-transitory computer-readable storage medium of clause 33, wherein the instructions further comprise instructions that, when executed by the one or more processors, cause the computer system to:

in order to at least partially fulfill a request to associate a payment amount to the object, the request specifying other information to be associated with the object and one or more images of the object, determine, based at least in part on the other information and the one or more images of the object, whether an association of the other information and the one or more images of the object is unique;

associate the payment amount to the object; and enable the object to be used to redeem the associated payment amount.

Clause 35. The non-transitory computer-readable storage medium of clause 34, wherein the request is received through an interface, the interface specifying one or more objects from which the object is selected to generate the request.

Clause 36. The non-transitory computer-readable storage medium of any of clauses 33 to 35, wherein the instructions further comprise instructions that, when executed by the one or more processors, cause the computer system to determine the associated payment amount based at least in part on the one or more images of the object.

Clause 37. The non-transitory computer-readable storage medium of any of clauses 33 to 36, wherein:

the other information is based at least in part on one or more representations of features of a recipient; and the instructions further comprise instructions that, when executed by the one or more processors, cause the computer system to utilize the other information and reference information based at least in part on the one or more images to verify that the one or more images and the one or more representations of features of the recipient correspond to an association between the photographic image and the object.

Clause 38. The non-transitory computer-readable storage medium of clause 37, wherein the instructions further comprise instructions that, when executed by the one or more processors, cause the system to utilize one or more facial recognition algorithms to verify, based at least in part on the one or more representations of features of the recipient, that the recipient is authorized to redeem the payment value using the object.

Clause 39. The non-transitory computer-readable storage medium of any of clauses 33 to 38, wherein the other information comprises recipient information that specifies a recipient of the object.

Clause 40. The non-transitory computer-readable storage medium of any of clauses 33 to 39, wherein the object is one of multiple, three-dimensional copies of a same item.

Clause 41. A computer-implemented method, comprising: under the control of one or more computer systems configured with executable instructions, obtaining, in connection with a request to associate a payment amount to an object, one or more images of the object;

determining, based at least in part on the one or more images, one or more unique, non-alphanumeric features of the object;

as a result of determining the one or more unique, non-alphanumeric features of the object, updating at least one database to associate the payment amount to the object;

receiving a request to redeem at least a portion of the payment amount, the request specifying one or more images;

verifying, based at least in part on the one or more images and the one or more unique, non-alphanumeric features, that the one or more images correspond to the object; and updating the at least one database in accordance with redemption of the at least the portion of the payment amount.

Clause 42. The computer-implemented method of clause 41, wherein determining one or more unique non-alphanumeric features of the object includes:

decomposing the obtained one or more images into one or more data vectors, the one or more data vectors specifying spatial coordinates of one or more features of the object; and comparing the one or more data vectors to data vectors of individual recorded objects of a set of recorded payment objects to identify unique data vectors of the obtained one or more images.

Clause 43. The computer-implemented method of clause 41 or 42, further comprising providing the object to enable redemption of the at least the portion of the payment amount.

Clause 44. The computer-implemented method of any of clauses 41 to 43, further comprising determining, based at least in part on the one or more images of the object, one or more unique alphanumeric features of the object usable to associate the payment amount to the object.

Clause 45. A system, comprising at least one computing device configured to implement one or more services, wherein the one or more services are configured to:

determine, based at least in part on one or more images of an inanimate object, a unique set of non-alphanumeric, non-physiological features of the object, the inanimate object being transferrable from one user to another;

as a result of determining the unique set of non-alphanumeric, non-physiological features of the inanimate object, associate information to the inanimate object such that the inanimate object is usable for at least one mode of authentication by use of the unique set of non-alphanumeric, non-physiological features to demonstrate access to the object; and enable the inanimate object to be used for the at least one mode of authentication.

Clause 46. The system of clause 45, wherein the one or more services are further configured to receive a request to associate the information to the inanimate object, the request including the one or more images of the inanimate object.

Clause 47. The system of clause 45 or 46, wherein the one or more images of the inanimate object are obtained by scanning the inanimate object at one or more distinct angles.

Clause 48. The system of any of clauses 45 to 47, wherein the one or more images of the inanimate object are obtained from a customer computer system, the customer computer system having further specified a recipient computer system usable to use the inanimate object for the at least one mode of authentication to enable the inanimate object to be used for the at least one mode of authentication.

Clause 49. The system of any of clauses 45 to 48, wherein:

the inanimate object is associated with a second object; and the at least one mode of authentication is based at least in part on the association between the information associated with the inanimate object and the second object.

Clause 50. The system of clause 49, wherein:

the second object is an image comprising one or more representations of features of a recipient; and the one or more services are further configured to utilize one or more image processing algorithms to determine whether the association between the information associated with the inanimate object and the one or more representations of features of the recipient satisfy the at least one mode of authentication.

Clause 51. The system of any of clauses 45 to 50, wherein the one or more services are further configured to use a secure processor to obtain a cryptographic measurement of code used to determine the unique set of non-alphanumeric, non-physiological features of the inanimate object.

Clause 52. The system of any of clauses 45 to 51, wherein determining the one or more unique non-alphanumeric features of the object includes:

decomposing the obtained one or more images into one or more data vectors, the one or more data vectors specifying spatial coordinates of one or more features of the inanimate object; and comparing the one or more data vectors to data vectors of individual recorded inanimate objects of a set of recorded inanimate objects to identify unique data vectors of the obtained one or more images.

Clause 53. A non-transitory computer-readable storage medium having stored thereon executable instructions that, when executed by one or more processors of a computer system, cause the computer system to at least:

receive a request to redeem at least a portion of a payment amount associated with an object, the request specifying one or more images of the object and the object having one or more unique, non-alphanumeric features associated with the payment amount within a database;

verify, based at least in part on the one or more images, the one or more unique, non-alphanumeric features, that the one or more images correspond to the object; and update, within the database, the payment amount associated with the object in accordance with redemption of the at least the portion of the payment amount.

Clause 54. The non-transitory computer-readable storage medium of clause 53, wherein the instructions further comprise instructions that, when executed by the one or more processors, cause the computer system to:

in order to at least partially fulfill a request to associate a payment amount to the object, the request including one or more images of the object, determine, based at least in part on the one or more images of the object, the one or more unique non-alphanumeric features of the object;

associate the payment amount to the object; and enable the object to be used to redeem the at least the portion of the associated payment amount.

Clause 55. The non-transitory computer-readable storage medium of clause 54, wherein determining the one or more unique non-alphanumeric features of the object includes:

decomposing the obtained one or more images into one or more data vectors, the one or more data vectors specifying spatial coordinates of one or more features of the object; and comparing the one or more data vectors to data vectors of individual recorded payment objects of a set of recorded payment objects to identify unique data vectors of the obtained one or more images.

Clause 56. The non-transitory computer-readable storage medium of clause 54 or 55, wherein the instructions further comprise instructions that, when executed by the one or more processors, cause the computer system to update at least one database to associate the payment amount to the object as a result of determining the one or more unique, non-alphanumeric features of the object.

Clause 57. The non-transitory computer-readable storage medium of any of clauses 54 to 56, wherein the instructions further comprise instructions that, when executed by the one or more processors, cause the computer system to determine, based at least in part on one or more images of an object, one or more unique alphanumeric features of the object usable to associate the payment amount to the object.

Clause 58. The non-transitory computer-readable storage medium of any of clauses 53 to 57, wherein:

the one or more images include one or more representations of features of a recipient; and the instructions further comprise instructions that, when executed by the one or more processors, cause the computer system to utilize one or more facial recognition algorithms to verify the one or more unique non-alphanumeric features of the object.

Clause 59. The non-transitory computer-readable storage medium of any of clauses 53 to 58, wherein:

the one or more images include a photographic image of a handwritten note including one or more handwritten elements; and the instructions further comprise instructions that, when executed by the one or more processors, cause the computer system to utilize one or more algorithms to analyze the handwritten note and extract the one or more handwritten elements to verify the one or more unique non-alphanumeric features of the object.

Clause 60. The non-transitory computer-readable storage medium of any of clauses 53 to 59, wherein the associated payment amount is determined based at least in part on the one or more images of the object.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a request to associate a payment amount with unique physical three-dimensional contours of a unique physical external structure of an existing physical object, the request specifying recipient information and one or more images taken of the unique physical three-dimensional contours of the unique physical external structure of the existing physical object;
    determining, by a computer processor, that the one or more images taken of the unique physical three-dimensional contours of the unique physical external structure of the existing physical object are unique based on a decomposition of the one or more images taken of the unique physical three-dimensional contours of the existing physical object into one or more data vectors;
    identifying an association between the recipient information and the unique physical three-dimensional contours of the unique physical external structure of the existing physical object is unique in a database that associates instances of recipient information with corresponding objects;
    associating the payment amount with the unique physical three-dimensional contours of the unique physical external structure of the existing physical object and the recipient information in the database;
    receiving a request to redeem at least a portion of the payment amount;
    in response to the request to redeem the at least the portion of the payment amount, a user device comprising a camera presenting instructions for capturing one or more images of the existing physical object;
    obtaining information specifying the one or more images of the existing physical object captured by the camera of the user device and the recipient information;
    verifying, based at least in part on the one or more images of the existing physical object and the recipient information, that the one or more images of the existing physical object and the recipient information correspond to the association between the recipient information and the unique physical three-dimensional contours of the unique physical external structure of the existing physical object; and
    updating the database in accordance with redemption of the at least the portion of the payment amount.

2. The computer-implemented method of claim 1, further comprising providing the existing physical object to enable redemption of the at least the portion of the payment amount.

3. The computer-implemented method of claim 1, wherein the recipient information includes recipient biometric information, one or more recipient account identifiers, one or more recipient e-mail addresses, and one or more recipient usernames for one or more services.

4. The computer-implemented method of claim 1, wherein the request is received through an interface, the interface specifying one or more objects from which the existing physical object is selected to generate the request.

5. A non-transitory computer-readable storage medium having stored thereon executable instructions that, as a result of being executed by one or more processors of a computer system, cause the computer system to at least:
   receive a request to redeem at least a portion of a payment amount associated with unique physical three-dimensional contours of a physical external structure of an existing physical object;
   determine that one or more images taken of the unique physical three-dimensional contours of the physical external structure of the existing physical object are unique based on a decomposition of the one or more images taken of the unique physical three-dimensional contours of the physical external structure of the existing physical object into one or more data vectors;
   in response to the request to redeem the at least the portion of the payment amount, a user device comprising a camera presenting instructions for capturing one or more images of the existing physical object;
   obtain information, specifying the one or more images of the existing physical object captured by the camera of the user device and other information associated with the existing physical object;
   verify, based at least in part on the one or more images of the existing physical object and the other information, that the one or more images of the existing physical object and the other information correspond to an association between the other information and the unique physical three-dimensional contours of the physical external structure of the existing physical object; and
   update the payment amount associated with the unique physical three-dimensional contours of the physical external structure of the existing physical object in accordance with redemption of the at least the portion of the payment amount.

6. The non-transitory computer-readable storage medium of claim 5, wherein the instructions further comprise instructions that, as a result of being executed by the one or more processors, cause the computer system to:
   in order to at least partially fulfill a request to associate a payment amount to the existing physical object, the request specifying the other information to be associated with the existing physical object and the one or more images of the existing physical object, determine, based at least in part on the other information and the one or more images of the existing physical object, whether an association of the other information and the one or more images of the existing physical object is unique;
   associate the payment amount to the existing physical object; and
   redeem the associated payment amount using the existing physical object.

7. The non-transitory computer-readable storage medium of claim 6, wherein the request is received through an interface, the interface specifying one or more objects from which the existing physical object is selected to generate the request.

8. The non-transitory computer-readable storage medium of claim 5, wherein the instructions further comprise instructions that, as a result of being executed by the one or more processors, cause the computer system to determine the associated payment amount based at least in part on the one or more images of the existing physical object.

9. The non-transitory computer-readable storage medium of claim 5, wherein:
   the other information is based at least in part on one or more representations of features of a recipient; and
   the instructions further comprise instructions that, as a result of being executed by the one or more processors, cause the computer system to utilize the other information and reference information based at least in part on the one or more images of the existing physical object to verify that the one or more images of the existing physical object and the one or more representations of features of the recipient correspond to an association between the one or more images of the existing physical object and the existing physical object.

10. The non-transitory computer-readable storage medium of claim 9, wherein the instructions further comprise instructions that, as a result of being executed by the one or more processors, cause the system to utilize one or more facial recognition algorithms to verify, based at least in part on the one or more representations of features of the recipient, that the recipient is authorized to redeem the payment amount using the existing physical object.

11. The non-transitory computer-readable storage medium of claim 5, wherein the other information comprises recipient information that specifies a recipient of the existing physical object.

12. The non-transitory computer-readable storage medium of claim 5, wherein the existing physical object is one of multiple, three-dimensional copies of a same item.

13. A system, comprising at least one computing device configured to implement one or more services, wherein the one or more services:
   receive a request to associate a payment amount with unique physical three-dimensional contours of a physical external structure of an existing physical object;
   determine that one or more images taken of the unique physical three-dimensional contours of the physical external structure of the existing physical object are unique based on a decomposition of the one or more images taken of the unique physical three-dimensional contours of the physical external structure of the existing physical object into one or more data vectors;
   in response to the request to redeem the at least the portion of the payment amount, a device comprising an imaging device to present instructions for capturing one or more images of the existing physical object;
   obtain information, specifying recipient information and the one or more images taken of the existing physical object by the imaging device of the device;
   identify an association between the recipient information and the unique physical three-dimensional contours of the physical external structure of the existing physical object is unique in a database that associates instances of the recipient information with corresponding objects; and
   associate the payment amount with the unique physical three-dimensional contours of the physical external structure of the existing physical object and the recipient information in the database.

14. The system of claim 13, wherein the one or more services further:
   receive a request specifying one or more images; and
   verify, based at least in part on the one or more images that the one or more images correspond to the existing physical object.

15. The system of claim 13, wherein the existing physical object is one of multiple, three-dimensional copies of a same item.

16. The system of claim 13, wherein: the one or more services further receive one or more representations of features of a recipient; and the one or more services further utilize the one or more representations of features of the recipient to associate the existing physical object with the recipient.

17. The system of claim 16, wherein the one or more services further utilize one or more facial recognition algorithms to verify, based at least in part on the one or more representations of features of the recipient, that the recipient is authorized to perform one or more operations.

18. The system of claim 13, wherein the associated recipient information is determined based at least in part on the one or more images of the existing physical object.

19. The system of claim 13, wherein the one or more services further:
- transform, using a one-way function, information specifying an association between the payment amount and the existing physical object to generate transformed information; and
- store the transformed information in a database usable to redeem the associated payment amount using the existing physical object and other information.

* * * * *